(12) United States Patent
Anderson et al.

(10) Patent No.: US 7,589,877 B2
(45) Date of Patent: Sep. 15, 2009

(54) SHORT STACK RECORDING IN HOLOGRAPHIC MEMORY SYSTEMS

(75) Inventors: Ken E. Anderson, Boulder, CO (US); William L. Wilson, Longmont, CO (US); Kevin R. Curtis, Longmont, CO (US)

(73) Assignee: Inphase Technologies, Inc., Longmont, CO (US)

( * ) Notice: Subject to any disclaimer, the term of this patent is extended or adjusted under 35 U.S.C. 154(b) by 454 days.

(21) Appl. No.: 11/291,840

(22) Filed: Dec. 2, 2005

(65) Prior Publication Data

US 2007/0127100 A1 Jun. 7, 2007

(51) Int. Cl.
*G03H 1/28* (2006.01)
*G03H 1/30* (2006.01)

(52) U.S. Cl. .......................... 359/24; 359/25
(58) Field of Classification Search ............ 359/22, 359/24, 25
See application file for complete search history.

(56) References Cited

U.S. PATENT DOCUMENTS

| | | | |
|---|---|---|---|
| 5,719,691 A | 2/1998 | Curtis et al. | |
| 5,850,299 A * | 12/1998 | Lande et al. | 359/1 |
| 5,874,187 A | 2/1999 | Colvin et al. | |
| 5,892,601 A | 4/1999 | Curtis et al. | |
| 6,103,454 A | 8/2000 | Dhar et al. | |
| 6,322,932 B1 | 11/2001 | Colvin et al. | |
| 6,482,551 B1 | 11/2002 | Dhar et al. | |
| 6,614,566 B1 | 9/2003 | Curtis et al. | |
| 6,697,180 B1 | 2/2004 | Wilson et al. | |
| 6,721,076 B2 | 4/2004 | King et al. | |
| 6,798,547 B2 | 9/2004 | Wilson et al. | |
| 7,382,508 B2 * | 6/2008 | Someno | 359/24 |
| 2004/0179251 A1 * | 9/2004 | Anderson et al. | 359/3 |
| 2007/0091399 A1 * | 4/2007 | Ihas et al. | 359/24 |

OTHER PUBLICATIONS

Tao, et al., "Spatioangular Multiplexed Storage of 750 Holograms in an Fe:LiNbO₃ Crystal," Optics Letters, vol. 18, No. 11, pp. 912-1014 (Jun. 1, 1993).
Psaltis, et al., "Holographic Storage Using Shift Multiplexing," Optics Letters, vol. 20, No. 7, pp. 782-785 (Apr. 1, 1995).

* cited by examiner

*Primary Examiner*—Alessandro Amari
(74) *Attorney, Agent, or Firm*—Vedder Price PC

(57) ABSTRACT

The present invention provides one or more books of holograms recorded in a recording medium, wherein two or more short stacks of the one or more books have locations that differ from each other by a movement difference. The present invention also provides methods and devices for recording and reading holograms from the one or more books of holograms.

52 Claims, 13 Drawing Sheets

SHORT STACK RECORDING IN HOLOGRAPHIC MEMORY SYSTEMS

CROSS-REFERENCE TO RELATED APPLICATIONS

This application claims priority of co-pending U.S. Published Patent Application No. 2004-0179251, entitled "Polytopic Multiplex Holography," filed Sep. 16, 2004 and the entire disclosure and contents of this application is hereby incorporated by reference.

BACKGROUND

1. Field of the Invention

The present invention relates generally to holographic storage systems.

2. Related Art

Developers of information storage devices and methods continue to seek increased storage capacity. As part of this development, page-wise memory systems, in particular holographic systems, have been suggested as alternatives to conventional memory devices. Holographic systems typically involve the storage and readout of entire pages of information, these pages consisting of arrayed patterns representing information. In general, a holographic system stores, in three dimensions, holographic representations of the pages as patterns of varying refractive index and/or absorption imprinted into a storage medium.

Holographic systems are characterized by their high density storage potential and the potential speed at which the stored information is randomly accessed and retrieved. In fact, because information is typically manipulated, i.e., stored and retrieved, on a page-by-page basis, the speed of storage and retrieval compares favorably to conventional magnetic disk or compact disk storage systems. A significant advantage of holographic systems, however, is storage capacity. It is possible for each page stored as a holographic image to contain thousands or even millions of elements. Theoretically, it is believed that at the present time, up to $10^{14}$ bits of information are storable in approximately $1.0$ $cm^3$ of holographic storage medium.

Multiplexing holograms means to store multiple holograms in the same volume or nearly the same volume. Typically, this is done by varying an angle, wavelength, phase code, or some other system parameter in the recording and readout setup. Many of these methods rely on a holographic phenomenon known as the Bragg effect in order to separate the holograms even though they are physically located within the same volume of media. Other multiplexing methods such as shift and, to some extent correlation, use the Bragg effect and relative motion of the media and input laser beams to overlap multiple holograms in the same volume of the media.

Using holography to store data has been well known for the last 30 years. The idea of increasing system capacity by combining spatial multiplexing (recording holograms in multiple locations but not significantly in the same volume of media) along with some other multiplexing technique that overlaps holograms within the same location has been well known for over 15 years. These multiplexing techniques have been used for distributing holograms on a disk, card, cube, or tape. Several patents and papers describe systems that take advantage of the combination of multiplexing techniques. For example, U.S. Pat. No. 6,798,547 to Wilson et al.; U.S. Pat. No. 6,721,076 to King et al.; U.S. Pat. No. 6,697,180 to Wilson et al. and U.S. Pat. No. 6,614,566 to Curtis et al. and U.S. Published Patent Application No. 2004-0179251 to Anderson, et al. describe multiplexing holographic storage techniques and the entire contents and disclosures of the above patents and patent application are hereby incorporated by reference. The paper Tao et al., "Spatioangular Multiplexed Storage of 750 Holograms in a FeLiNbO$_3$ Crystal" in Optic Letters, Vol. 18, No. 11, 912-1014 (1993) also describes multiplexing storage techniques and the entire contents and disclosure of this paper is hereby incorporated by reference.

SUMMARY

According to a first broad aspect of the present invention, there is provided a product comprising: a recording medium; and one or more books of holograms recorded in the recording medium, wherein two or more short stacks of the one or more books have locations that differ from each other by a movement difference.

According to a second broad aspect of the invention, there is provided a method comprising: recording a first short stack of holograms for each of one or more books in a recording medium; and recording one or more second short stacks of holograms for each of one or more books within the recording medium, wherein the first short stack and each second short stack have locations that differ from each other by a movement difference.

According to a third broad aspect of the invention, there is provided a device comprising: recording means for recording holograms to a recording medium; and control means for enabling the recording means to record one or more books of holograms in the recording medium, wherein two or more short stacks of the one or more books have locations that differ from each other by a movement difference.

According to a fourth broad aspect of the invention, there is provided a method comprising: providing one or more books of holograms recorded in the recording medium, wherein two or more short stacks of the one or more books have locations that differ from each other by a movement difference; and reading the holograms from the one or more books to provide information from the holograms to a user.

According to a fifth broad aspect of the invention, there is provided a device comprising: reading means for reading holograms recorded in a recording medium; and control means for enabling the reading means to read holograms from one or more books of holograms recorded in the recording medium, wherein two or more short stacks of the one or more books have locations that differ from each other by a movement difference.

BRIEF DESCRIPTION OF THE DRAWINGS

The invention will be described in conjunction with the accompanying drawings, in which.

DETAILED DESCRIPTION

Figure 1:
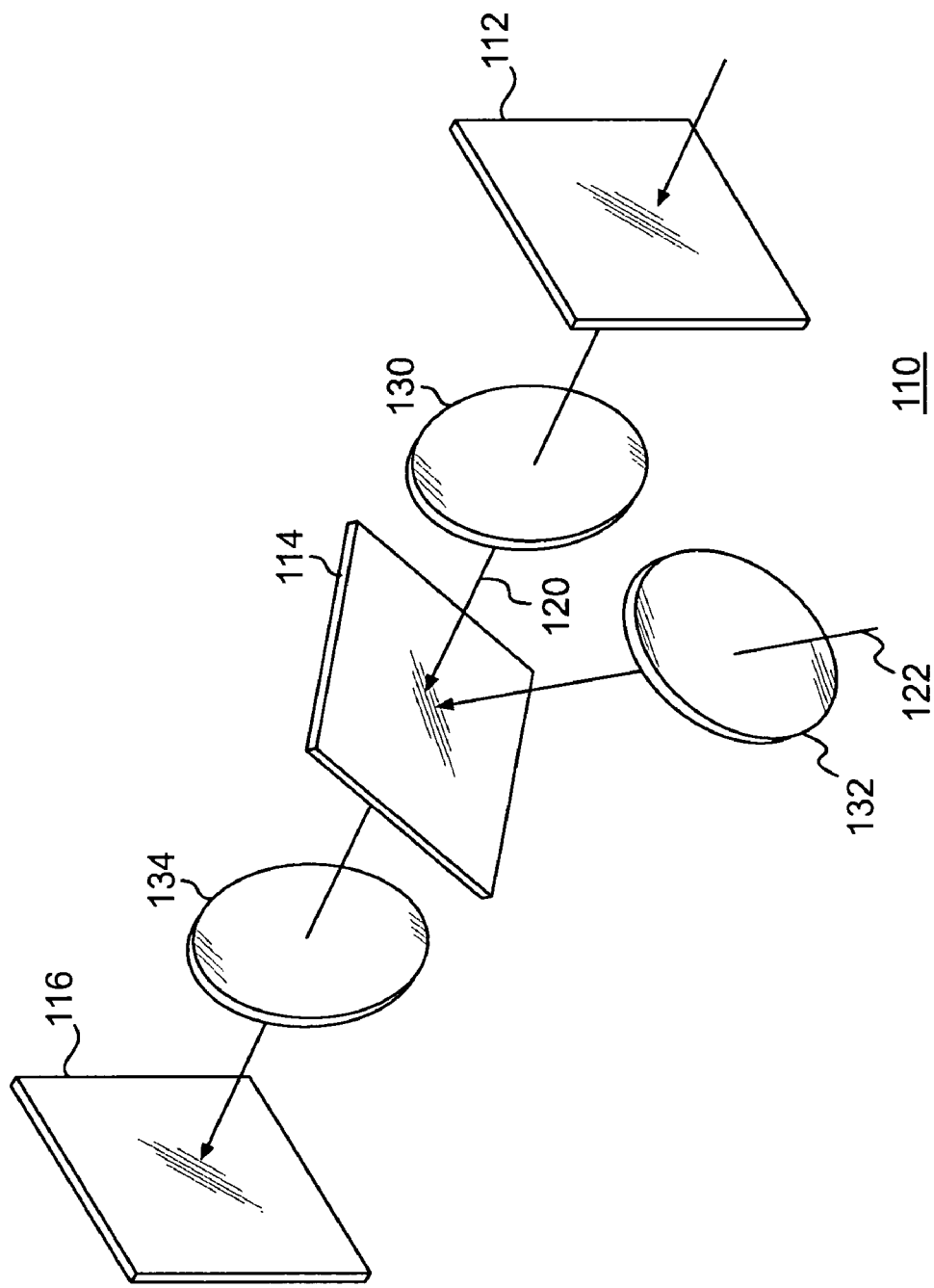
FIG. 1 shows the basic features of a holographic storage system in accordance with one embodiment of the present invention.

It is advantageous to define several terms before describing the invention. It should be appreciated that the following definitions are used throughout this application.

Definitions

Where the definition of terms departs from the commonly used meaning of the term, applicant intends to utilize the definitions provided below, unless specifically indicated.

For the purposes of the present invention, the terms "right", "left", "upper", "lower", "proximal" and "distal" refer to directions for a given drawing figure. For the purposes of the present invention, the objects, processes, etc., illustrated in the drawing figures may be rotated in space, unless otherwise indicated and the terms "right", "left", "upper", "lower", "proximal" and "distal" are only used for convenience in describing the features of the drawings. The terms "right" and "left" refer to opposite directions along the x-axis, the terms "proximal" and "distal" refer to opposite directions along the y-axis and the terms "upper" and "lower" refer to opposite directions along the z-axis. For purposes of illustration, data storage media in the illustrations are generally depicted as being flat and being oriented in the xy-plane. However, it should be understood that the present invention may be used with holographic storage media of various shapes and with various orientations, including orientations other than in the xy plane.

For the purposes of the present invention, the term "book" or "stack" refers to a group of short stacks of holograms that span an available angular range. A book is a group of short stacks where each hologram within the entire book still has a unique address (i.e., angle, for angle multiplexing). The term book refers to both traditional books and composite books.

For the purposes of the present invention, the term "column" refers to a plurality of books, possibly in different rows, generally arranged above and/or below each other in a columnar array.

For the purposes of the present invention, the term "composite book" refers to a book where at least some of the short stacks of the book do not occupy the same spatial location. In fact, it is often quite useful to "smear" out any optically induced distortions by placing short stacks in different spatial locations. In a composite book, the spatial locations of the short stacks may partially overlap one another, but differ enough spatially to mitigate any non-ideal media buildup due to multiple recordings in the same location.

For the purposes of the present invention, the term "computer system" refers to any type of computer system that implements software including an individual computer such as a personal computer, mainframe computer, mini-computer, etc. In addition computer system refers to any type of network of computers, such as a network of computers in a business, the Internet, personal digital assistant (PDA), devices such as a cell phone, a television, a videogame console, a compressed audio or video player such as an MP3 player, a DVD player, videogame system, handheld videogame system, a microwave oven, etc.

For the purposes of the present invention, the term "curvilinear motion" or "curvilinear shift" refers to motion along an open or closed curve, such as a circle, arc, parabola, etc. An example of curvilinear motion is rotational motion. For example, in recording books in a circular pattern, there may be a rotational shift between successive books if books are recorded in a circular pattern in a recording medium. Short stacks of a composite book may also be recorded using curvilinear shifts and/or radial shifts.

For the purposes of the present invention, the term "divergence" refers to the angle the edges of the diverging cone form with the direction of beam propagation.

For the purposes of the present invention, the term "dynamic range" or "M#" of a material refers to a measure of how many holograms at a particular diffraction efficiency can be multiplexed at a given location in the material and is related to the materials index change and material thickness.

For the purposes of the present invention, the term "holographic recording medium" refers to an article that is capable of recording and storing, in three dimensions, one or more holographic gratings as one or more pages as patterns of varying refractive index imprinted into an article.

For the purposes of the present invention, the term "information" refers to any type of information that may be recorded in a hologram or read from a hologram.

For the purposes of the present invention, the term "medium motion", unless specified, refers to the motion of a holographic recording medium relative to a reference and/or data beam. Medium motion may be due to moving the medium and/or moving the reference beam and/or moving the data beam. The motion may be planar translational, along a curve, etc. and may be in any direction or combination of directions.

For the purposes of the present invention, the term "movement difference" with respect to short stacks and/or books refers to short stacks and/or books that differ from each other by a spatial movement. For example, two short stacks may differ from each other by a rotational movement in space, a translational movement in space, a combination of rotational and translational movement in space, etc. A movement difference may be a vector. For short stacks or books that are at different angles with respect to each other, the movement difference between two short stacks or between two books is a rotational vector i.e. the direction of rotation about an axis and the amount of rotation in that direction that would cause one short stack or book to occupy the same location in space as another short stack or book, respectively. For translational movement, the movement difference between two short stacks or between two books is a translational vector, i.e., the direction of movement in a straight line and the amount of movement in that direction that would cause one short stack or book to occupy the same location in space as another short stack or book, respectively. A separation distance between two short stacks or books may be viewed as the scalar component of the movement difference between the respective short stacks or books for a movement distance that is a translational vector.

For the purposes of the present invention, the term "movement" or "shift" refers to movement in any direction or combination of directions. For example, a medium or recording device being moved in an xy, xz, or yz plane is an example of movement. Movement includes: translational, rotational, curvilinear and radial motion. In some embodiments of the present invention, books, stacks, short stacks, etc., may be located relative to other books, stacks, short stacks, etc., based on movement of the medium or recording device.

For the purposes of the present invention, the term "optimized short stack spacing" refers to short stacks of a composite book that have spatial locations that differ from each other by a distance of less than the polytopic stack distance for both of the short stacks.

Figure 3:
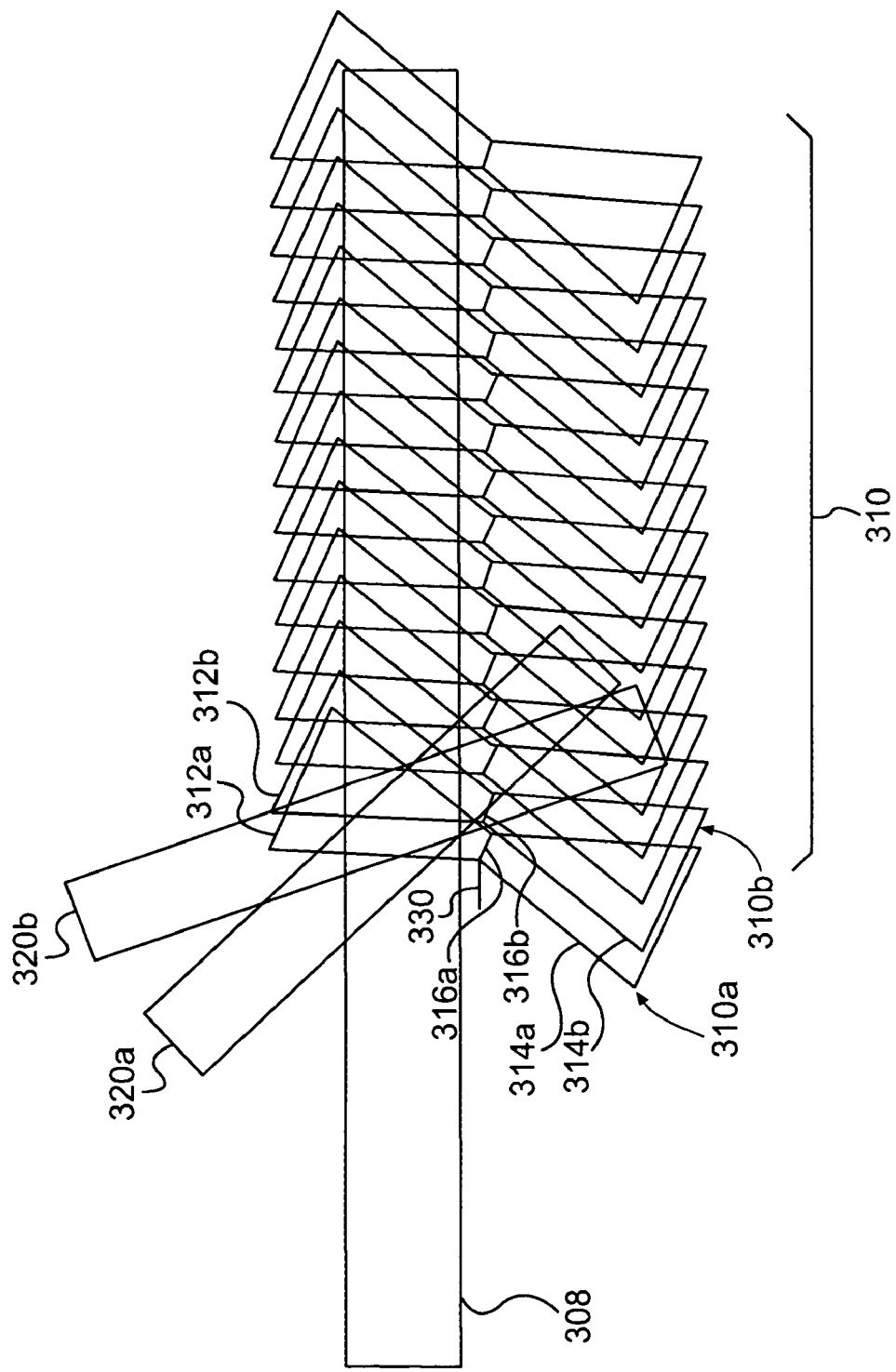
FIG. 3 is a diagram illustrating a method for polytopically multiplexing multiplexed stacks of holograms in a holographic medium.
Figure 5:
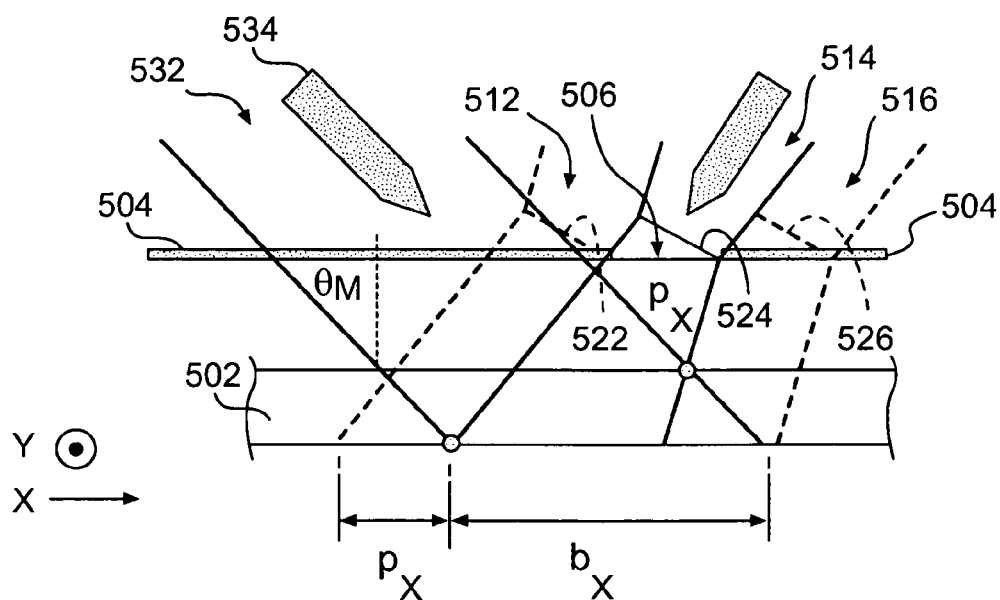
FIG. 5 is a schematic cross-sectional diagram of a polytopic move.

For the purposes of the present invention, the term "polytopic filter dimension" or "$p_x$" refers to the minimum separation distance between the equivalent edges of two overlapping books that allows for data from each book to be retrieved separately using a filter and a beam waist. Examples of polytopic filter dimension are shown in FIGS. 3 and 5 and are described in more detail below.

For the purposes of the present invention, the term "polytopic stack distance" refers to the distance d, where $$d = w \cos(\theta) + w \sin(\theta) \tan(\theta + \alpha)$$

and where w is the beam waist of a data beam used to record a group of holograms, θ is the incident angle of the reference beam used to record a group of holograms and a is the and $\alpha = \sin^{-1}$ (Numerical Aperture of the Fourier Transform (FT) lens used to record a hologram). The incident angle θ is measured with respect to a plane perpendicular to the surface of the recording medium.

For the purposes of the present invention, the term "radial motion" or "radial shift" refers to motion along a radius of a circle, oval, ellipse, etc. For example, in recording books in series of circular patterns, there may be a radial shift between the books deposited in an outer circle and a neighboring or overlapping inner circle. The radial shift may be the product of recording the inner circle after or before the outer circle of books, or, one or more books of the inner circle may be recorded either before or after one or more books of the outer circle. Short stacks of composite books may also be recorded using radial and/or curvilinear shifts.

For the purposes of the present invention, the term "row" refers to a plurality of books generally arranged along the same longitudinal axis, arc, circumference, ring, etc.

For the purposes of the present invention, the term "separation distance" refers to the distance between corresponding edges of two short stacks or books.

For the purposes of the present invention, the term "short stack distance" refers to the distance between short stacks for any combination of reference beam angles and/or data beam angles used to record a short stack.

For the purposes of the present invention, the term "short stack" refers to sub-group of holograms within the address range of a book. For example, a book may be considered as a set of addresses that contain angles 1-500. This angular range may be further separated into "short stacks" so that short stack #1 contains angles 1-100, short stack #2 contains angles 101-200, etc.

Figure 14:
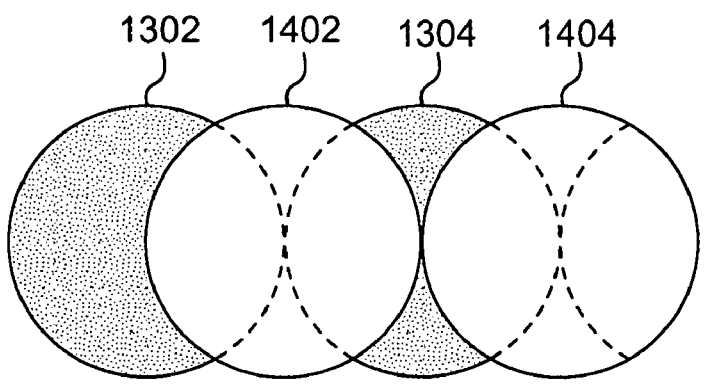
FIG. 14 is a schematic top view of one row of books in accordance with one embodiment of the present invention.
Figure 16:
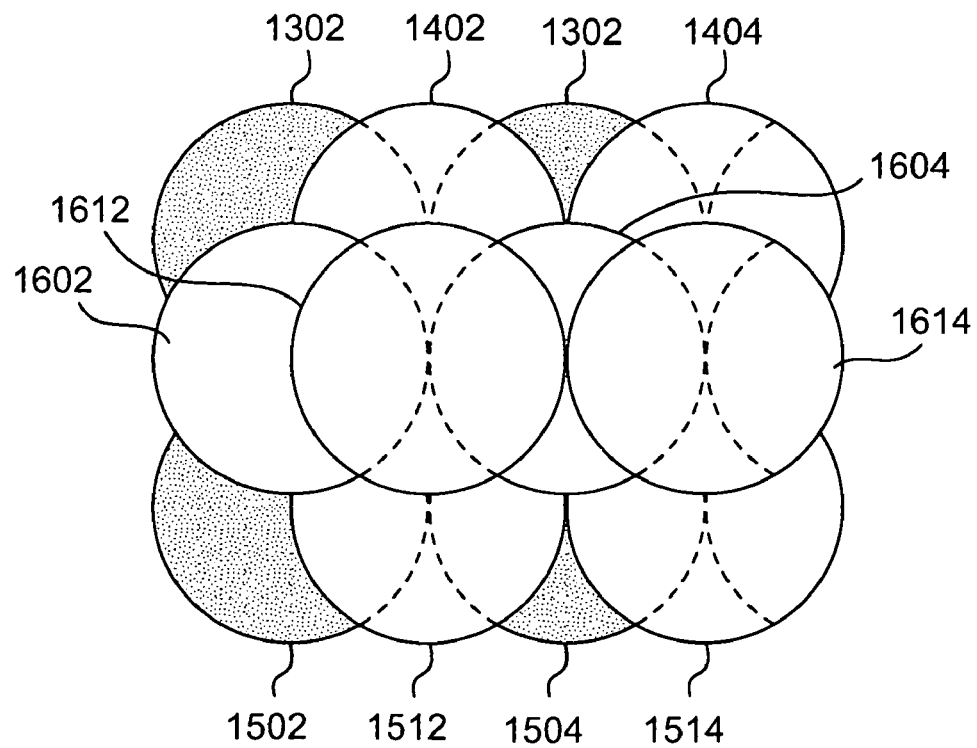
FIG. 16 is a schematic top view three rows of books, in accordance with one embodiment of the present invention.

For the purposes of the present invention, the term "skip-sorted" refers to holograms, short stacks, books, rows of books, etc. that are recorded in time in an order that differs from their order in space. For example, FIG. 14 shows an example of books that are skip-sorted, because the books are ordered left-to-right by location in the following order: 1302-1402-1304-1404. However, the books are described as being recorded in the order 1302-1304-1402-1404. FIG. 16 shows an example of books that are skip-sorted and rows that are skip-sorted. Similarly, short stacks of books may be skip-sorted, by set of books, by row of books, by column of books, etc.

For the purposes of the present invention, the term "traditional book" refers to the traditional meaning of the term "book" with respect to holograms, i.e., a group of holograms that occupy the same spatial location. Therefore, a traditional book can be defined as a group of "short stacks" where there is no separation between short stacks and therefore occupy the same spatial location.

For the purposes of the present invention, the term "translational motion" or "translational shift" refers to motion in a linear or straight line, or motion along a combination of linear/straight lines. For example, motion along the perimeter of a triangle, rectangle, parallelogram, trapezoid, pentagon, hexagon, etc., would be translational motion.

For the purposes of the present invention, the term "user" refers to any individual, group of individuals, software, computer system, electronic device (e.g., personal digital assistant), etc. that uses information that is stored in a hologram.

For the purposes of the present invention, the term "waist" of a beam indicates either a Fourier transform plane for the beam or the image plane for a beam.

Description

It should be noted that in the figures described below, many features may not be drawn to scale.

FIG. 1 illustrates the basic components of a holographic system 110. System 110 contains a modulating device 112, a photorecording medium 114 and a sensor 116. Modulating device 112 is any device capable of optically representing data in two-dimensions. Device 112 is typically a spatial light modulator that is attached to an encoding unit which encodes data onto the modulator. Based on the encoding, device 112 selectively passes or blocks portions of a beam reflecting off or passing through device 112. In this manner, a signal beam 120 is encoded with a data image. The image is stored by interfering the encoded signal beam 120 with a reference beam 122 at a location on or within photorecording medium 114. The interference creates an interference pattern (or hologram) that is captured within medium 114 as a pattern of, for example, varying refractive index. It is possible for more than one holographic image to be stored at a single location, or for holograms to be stored in overlapping positions, by, for example, varying the angle, the wavelength, or the phase of the reference beam 122 (generally referred to as angle, wavelength and phase correlation multiplexing, respectively). Signal beam 120 typically passes through lens 130 before being intersected with reference beam 122 in medium 114. It is possible for reference beam 122 to pass through lens 132 before this intersection. Once data is stored in medium 114, it is possible to retrieve the data by intersecting reference beam 122 with medium 114 at the same location and at the same angle, wavelength, or phase at which reference beam 122 was directed during storage of the data. The reconstructed data passes through lens 134 and is detected by sensor 116. Sensor 116 is, for example, a charged coupled device or an active pixel CMOS sensor. Sensor 116 typically is attached to a unit that decodes the data.

One method of holographic storage is phase correlation multiplex holography, which is described in U.S. Pat. No. 5,719,691 issued Feb. 17, 1998, the entire contents and disclosure of which is incorporated by reference. In one embodiment of phase correlation multiplex holography, a reference light beam is passed through a phase mask and intersected in the recording medium with a signal beam that has passed through an array representing data, thereby forming a hologram in the medium. The position of the medium relative to the signal and reference beams is changed to allow the data to be stored at overlapping areas in the medium. The data is later reconstructed by passing a reference beam through the original storage location with the same phase modulation used during data storage. It is also possible to use volume holograms as passive optical components to control or modify light directed at the medium, e.g., filters or beam steerers. Other techniques that store data by using motion of the media relative to the beams include aperture multiplexing (see U.S. Pat. No. 5,892,601) and shift multiplexing (see *Optics Letters*, Vol. 20, No. 7, 782-784 (1995)). Phase correlation, aperture and shift multiplexing all involve storing holograms in different locations, but with some overlap between them.

Figure 2:
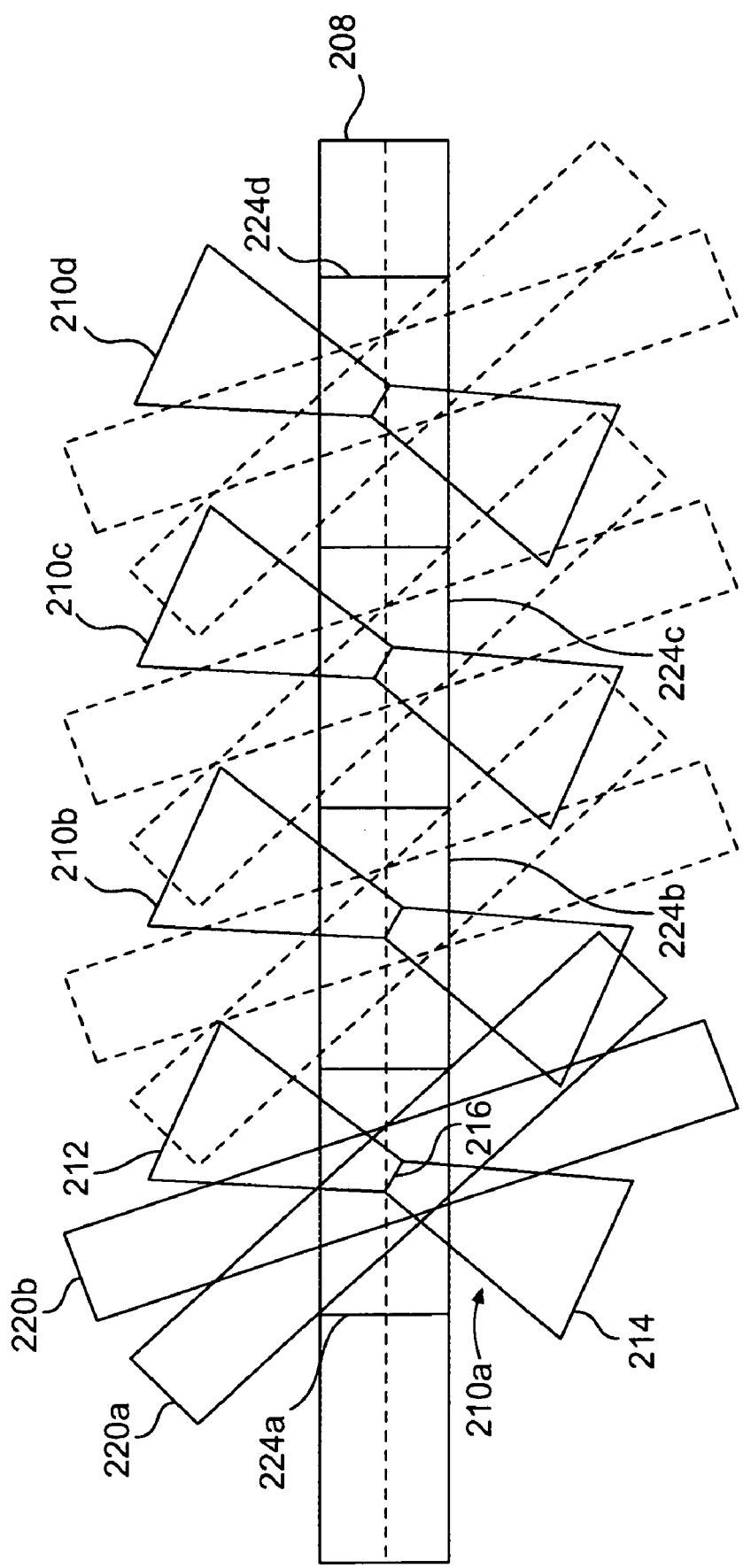
FIG. 2 is a diagram illustrating a prior art method of multiplexing of multiplexed stacks of holograms in a holographic medium.

In prior art methods of spatial and angle multiplexing holograms in a thick media the beam expansion that occurs throughout the thickness of the media, the hologram size in the plane, may be much larger than the beam waist. FIG. 2 illustrates a prior art method of spatial and angle multiplexing holograms in a relatively thick holographic medium 208 being created by a data beam 210a and a reference beam 220a. Data beam 210a includes an incoming converging cone 212, an outgoing diverging cone 214 and a waist 216, where the data beam is focused in medium 208 and where its spot size is smallest. Also illustrated is a reference beam 220b, which may be used to generate a second hologram in medium 208 that is angle multiplexed with the hologram generated by reference beam 220a and data beam 210a. A number of holograms, or a stack, may be angle multiplexed in a portion 224a of the medium. Medium 208 or data beam 210a may then be shifted to record a second stack of holograms, indicated by data beam 210b, shifted again for a third stack, etc. Data beams 210b, 210c and 210d which, along with reference beams shown in phantom lines, generate additional stacks of holograms in portions 224b, 224c and 224d, respectively, of medium 208. Portions 224a-224d of medium 208 outline the area used by each stack.

As can be seen in this FIG. 2, portions 224a-224d are significantly larger than an individual beam waist, such as beam waist 216. This is because in the prior art both the data beam and the reference beams determine the area that a given hologram stack uses. To spatially multiplex these holograms, stacks of holograms must be separated by at least the length of a portion 224a-224d of medium 208. This has consequences for achievable densities and capacities that can be reached using holographic storage. High density is achieved by multiplexing more holograms in one location and by placing these stacks as close as possible, however, close spacing of stacks is limited.

Additionally, the divergence of a beam can limit the minimum distance between stacks. The amount of divergence, which can be expressed as the angle the edges of the diverging cone form with the direction of beam propagation, is dependent on the numerical aperture of a lens through which the data beam is projected. For high NA (numerical aperture) systems that are typically used for storage systems, the amount of data beam divergence in holographic media, such as the medium of FIG. 2, is relatively significant for relatively thick media. In addition, the number of holograms that can be multiplexed at one place (one stack) is determined by the thickness of the media. More holograms can be stored in thicker media due to the increase in the Bragg selectivity and dynamic range. Unfortunately, if the media is made thicker the spatial stack size increases due to the increased divergence of the beam. Thus the achievable density/capacity saturates at a certain thickness. Thus, density cannot be increased significantly by increasing the material thickness once the saturation thickness is reached.

This has very serious consequences for achievable densities and capacities that can be reached using holographic storage. High density is achieved by multiplexing more holograms in one location and by placing these stacks as close as possible. Placing the stacks as close as possible is limited as discussed above. Conversely, increasing media thickness to multiplex more holograms at one stack also increases the stack size (due to the increased divergence of the beam), eventually limiting further increases in the density once the saturation thickness is reached.

One method of multiplexing is described in the article, Tao et al., "Spatioangular Multiplexed Storage of 750 Holograms in an FeLiNbO3 Crystal", *Optics Letters*, Vol. 18, No. 11 pp. 912-914, 1993, the entire contents and disclosure of which is incorporated by reference.

In addition, the stacks do not have to be recorded fully at one time. For material reasons it may be better to partially fill the neighboring stacks and then come back and completely fill the stacks as the neighborhood of the stack recorded is used. This technique may also be used with high numerical aperture lenses or holographic optical elements that function as lenses. The holograms may be recorded by reflection or transmission.

For holograms or books that overlap or are close to each other the spatial intensity variation of the optical beams, as noted above, used to record single or multiple pages in a book of holograms can result in optical and recording problems for the holograms, including the possibility for "cross-talk" noise being introduced in a given hologram during the readout and/or recording of neighboring holograms. The index distortions and the different amount of energy used on near or adjacent holograms causes SNR (signal-to-noise ratio) loss. Polytopic multiplexing, where the books or pages of holograms are recorded in a particular order to make the media exposure spatially more uniform, overcomes some of the SNR loss. Polytopic multiplexing enables several advantages in that the full multiplexing (angle, wavelength, etc.) of the stack may be used, the stacks may be placed a minimal distance from each other that is not determined by the thickness of the media. This allows the full use of thick films (>100 microns) and is particularly useful for films greater than 400 microns to many millimeters.

Using polytopic multiplexing, as illustrated in FIG. 3, with a medium 308, a plurality of holograms are generated by a plurality of data beams 310 in which the beam waist 316a is placed or positioned outside the media 308. Each of the plurality of data beams 310 includes an incoming converging cone and outgoing diverging cone and a beam waist. In particular, a first data beam 310a includes a first incoming converging cone 312a and a first outgoing diverging cone 314a and a first beam waist 316a. As is understood in the art, data beam 310a and first reference beam 320a generate a first hologram, with additional holograms being generated that are angled, or otherwise multiplexed with the first hologram at the first stack location and spatially coincident with converging cone 312a.

Second data beam 310b, which is not spatially coincident with first data beam 310a, includes a second incoming convergence cone 312b, a second outgoing diverging cone 314b and a second beam waist 316b, to create a second hologram at a second stack location. The second data beam 310b is directed such that second converging cone 312b partially spatially overlaps with first converging cone 312a of first data beam 310a inside of media 308. As such, when reproducing the first hologram in an output beam, information from the second hologram, as well as potentially other holograms created by other data beams 310, will be included in the output beam after the readout beam passes through media 308. Therefore, to confine the information to the desired stack, a filter block 330 adjacent to media 308 and in the path of a output beam, is used to filter out information from a second and potentially other, holograms which will also be included in the output beam.

Polytopic multiplexing allows holograms to be spatially multiplexed, as illustrated in FIG. 3 with partial spatial overlap between neighboring stacks of holograms. Each individual stack can additionally take full advantage of an alternate multiplexing scheme such as angle, wavelength, phase code, peristrophic, or fractal multiplexing. An amount equal to the polytopic stack distance separates the individual stacks of holograms. However, unlike more traditional approaches, the beam waist may be placed or positioned outside of the media such that there is significant beam overlap between stacks inside the media. Upon reconstruction, the data and its neighbors will all be readout simultaneously, however, an aperture (filter) is placed at the beam waist of the reconstructed data such that the neighbors that are read out do not make it to the camera plane and are thereby filtered out. The holograms may be multiplexed by combinations of the standard multiplexing techniques as well as by polytopic multiplexing.

Using polytopic multiplexing, as illustrated in FIG. 3, significant increases in density are achieved, particularly for thick media and high numerical aperture optical systems where the spot sizes are the smallest. The polytopic technique enables a system to fully utilize high numerical aperture lenses and independently choose the media thickness and therefore gain in both bit density and media dynamic range. Previous techniques were limited in their ability to spatially separate stacks of holograms due to significant amounts of beam divergence. High numerical aperture optics, despite the small beam waist, expand very quickly. The spatial separation of stacks in the prior art was limited by the size of the beam in the media after expansion and not limited by the spot size. Up to this point, there has always been a tradeoff between media thickness (and therefore dynamic range) and the lens numerical aperture.

In order to address the problem of the optically induced distortion associated with photopolymeric media, only a fixed number of holograms are recorded at a given location. The number of holograms recorded in each location must be below the distortion threshold of the media, after which the recording location is moved before continuing the recording process. The minimum size of the motion, whether it is the data beam or the recording medium, is determined by the fine structure of the data beam, (i.e., the data page structure). This motion maybe a rotation about the plane of the media centered on or off the center of the hologram, planar translational shift in any direction (x,y,z), or a rotation or curve about other axes. The goal of the motion is to in essence "average" or "smooth" out the intensity variations experienced by the material, thereby resulting in a uniform change in optical response and optical quality. This motion may be a rotation about the plane of the media centered on or off the center of the hologram, planar translational shift in any direction (x,y, z), etc. What is required is a relative motion so the media may be moved or the beams may be moved. The motion may not necessarily be directly related to the Bragg, correlation, or momentum motion required to separate holograms.

High density holographic storage systems, such as the system polytopic multiplexing systems of FIGS. 2 and 3, gain their density advantage by recording more than one piece of information in a single volume of the recording medium. Data pages are recorded as a function of some parameter of the reference beam such as: angle, wavelength, position, phase, etc. For example, FIG. 2 shows the use of reference beams having different angles, while FIG. 3 shows the use of reference beams having different positions. In such systems, the dynamic range or "address space" available to the volume is exhausted before proceeding to the next non-overlapping volume recording location, or to an overlapping volume if shift, correlation, or polytopic multiplexing are used.

Generally when recording in a high performance holographic memory systems the evolution of the recording volume during the recording process defines the performance limits of the system. Given the extremely high optical bandwidth of the data pages used in high capacity systems, the imaging quality of the optical system, including recording medium, may be extremely important. The dichotomy is that information is stored in the recording medium as index of refraction modulations and for optimal recording speed the medium is designed such that the index change per unit exposure is very large. In general the light intensity in the recording volume is non-uniform and that non-uniformity is manifest as a growing, varying index within the volume. The index structure induced from this non-uniformity optically distorts the medium degrading image clarity resulting in a rapid decrease in signal to noise of the recorded data.

High density holographic storage systems gain their density advantage by recording more than one piece of information in a single volume of the recording media. One example of polytopic multiplexing that may be used in various embodiments of the present invention is described in U.S. Published Patent Application No. 2004-0179251, entitled "Polytopic multiplex holography", the entire contents and disclosure of which is hereby incorporated by reference.

In general, the low spatial frequency components, lens aberrations and any other effect causing spatial intensity variations of the data beam being recorded is responsible for much of the media distortion and therefore signal degradation upon hologram reconstruction. The spatial intensity variations of the reference beam may contribute as well. The rate at which the distortion builds up can be defined as the number of exposures at particular energy before the image distortion manifests itself, (i.e., the integrated intensity of total exposure). In addition to this fundamental problem, the general evolution of the material optical response is also at issue. In addition, the medium sensitivity and dynamic range evolve during recording, exhausting the material dynamic range in one location and leaving a large index gradient between it and adjacent recording sites, thus complicating medium usage.

Figure 4:
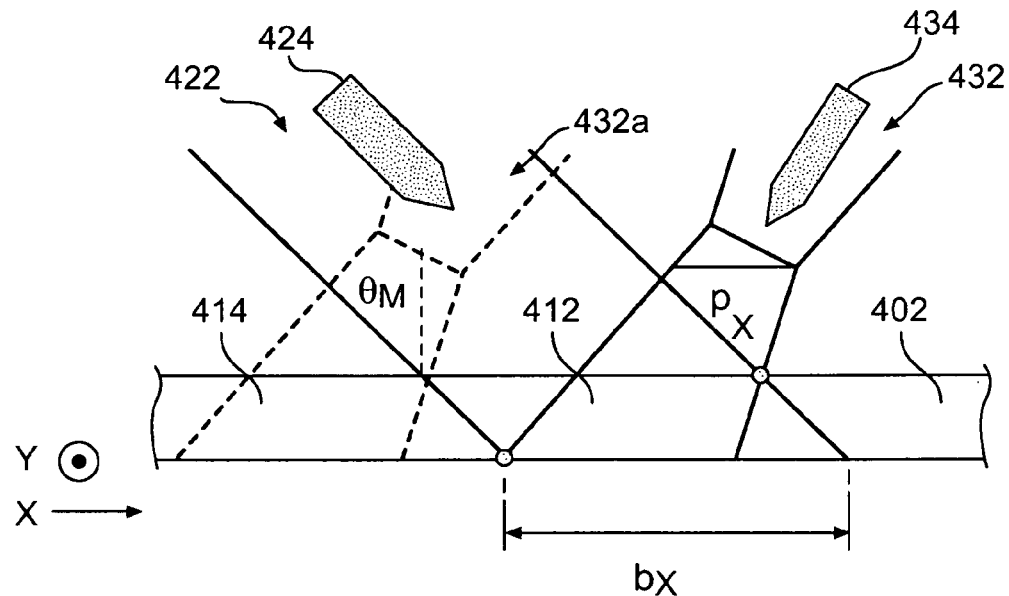
FIG. 4 is a schematic cross-sectional diagram of a spatial move.
Figure 6:
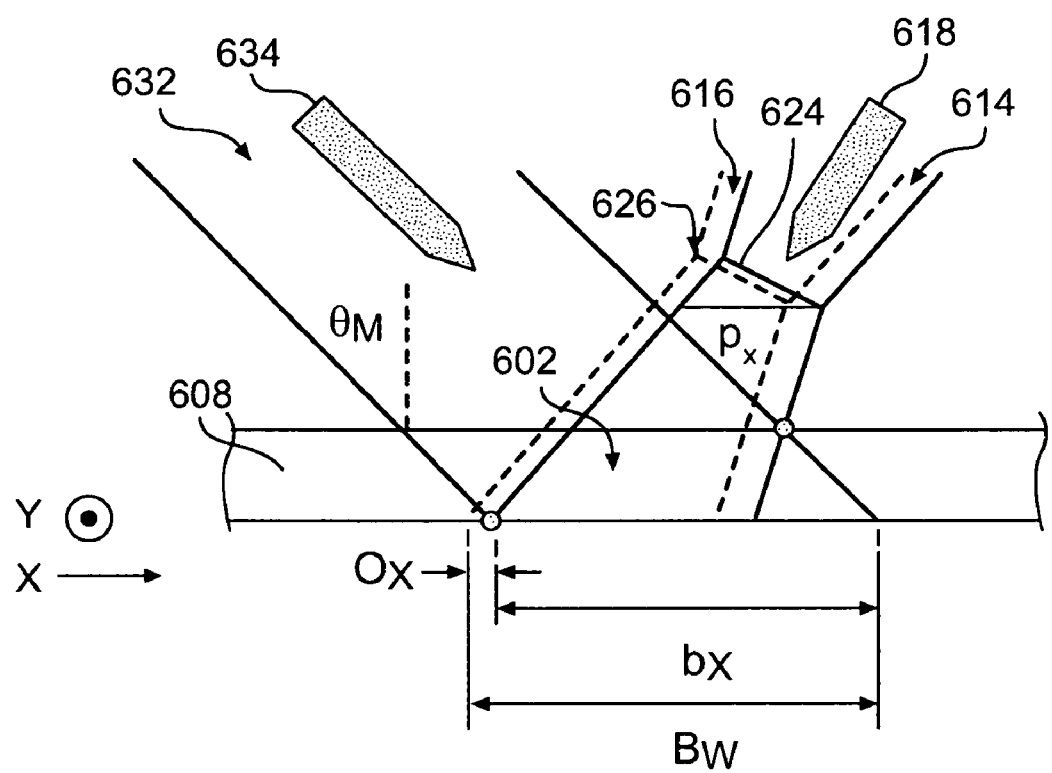
FIG. 6 is a schematic cross-sectional diagram two short stacks of a composite book being recorded to a recording medium in accordance with one embodiment of the present invention.

In one embodiment of the present invention, illustrated in FIG. 6, a planar translational medium motion is inside of the polytopic multiplexing distance. In order to illustrate such medium motion, an embodiment of the present invention will be compared to traditional book spacing as illustrated in FIG. 4 and polytopic book spacing as illustrated in FIG. 5. Although, for simplicity of illustration, the motion in FIG. 6 is only illustrated as being in one planar translational direction, the medium motion of the present invention may be in any direction or combination of directions. In FIGS. 4, 5 and 6, the x-axis is from left to right and the y-axis is perpendicular to the plane of the figures.

FIG. 4 illustrates the traditional minimum book spacing $b_x$ in a recording medium 402 to avoid simultaneous readout of holograms in neighboring books in 412 and 414. The book width $b_x$ is the same as the book spacing and depends on the incident angle $\theta_M$ of a reference beam 422 having a direction indicated by arrow 424. Shadow lines show data beam 432 having a direction indicated by arrow 434 at a second position 432a. A subsequent book (not shown) is produced by reference beam 422 covering data beam 432 at position 432a.

FIG. 5 illustrates polytopic book spacing $p_x$ in a recording medium 502. Using a polytopic filter 504 having a projected aperture 506 having a diameter $p_x$, subsequent data beams 512, 514 and 516 are spatially distinct only in the region of their waists 522, 524 and 526, respectively. As in FIG. 4, the book width $b_x$ is dependent on the incident angle $\theta_M$ of a reference beam 532 having a direction indicated by an arrow 534. However, the book spacing is now the polytopic distance, $p_x$, allowing many more books to be recorded in a given amount of space. This configuration leaves substantially no volume in medium 502 without data although this configuration introduces overlap complexity in the writing stage.

The size of the aperture in the filter is solely determined by the spatial bandwidth of the data beam. The filter may be relayed into the medium with lenses. Using lenses with higher numerical aperture reduces the imaged size of the polytopic filter. This in turn reduces the minimum book spacing increasing the achievable density.

Figure 7:
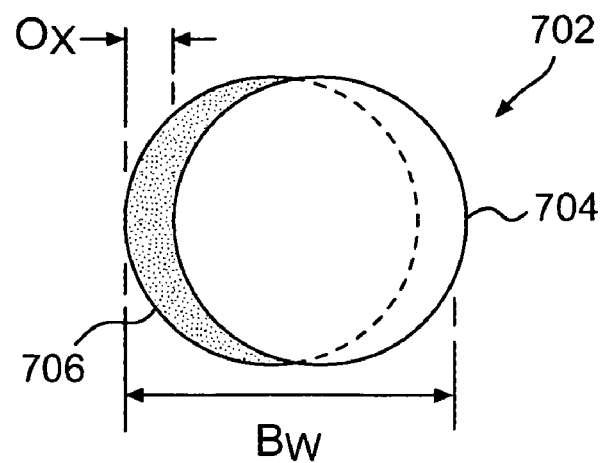
FIG. 7 is a schematic top view of the composite book of FIG. 6.

FIGS. 6 and 7 illustrates composite book 602 including two short stacks 704 and 706 being recorded in a recording medium 608 in accordance with one embodiment of the present invention. Using a polytopic filter (not shown) having a projected aperture having a diameter $p_x$, subsequent data beams 614 and 616, aimed in a direction indicated by arrow 618, are used to record short stacks 704 and 706. Data beams 614 and 616 have beam waists 624 and 626, respectively. Short stacks 704 and 706 have an optimized short stack spacing of $o_x$, the separation distance between the two short stacks. The distance $b_x$ represents the projected width of each of short stacks 704 and 706 and is dependent on the incident angle $\theta_M$ of a reference beam 632 having a direction indicated by an arrow 634. This distance $B_w$ is the book width in the medium for book 702 and is equal to $b_x + o_x$.

In one embodiment, the separation distance between short stacks of a book is less than the polytopic stack distance for all of the short stacks of the book. In another embodiment, the separation distance between short stacks of a book is measured as a percent of the polytopic stack distance for all of the short stacks of the book. In another embodiment, the separation between short stacks of a book is measured as an angular rotation between the short stacks.

For simplicity, in FIGS. 4, 5 and 6, a data beam having the same incident angle and the same beam waist and a reference beam having the same incident angle are used for illustration purposes only to demonstrate recording each book and/or short stack. However, when books and/or sub-stacks are recorded using polytopic multiplexing, the incident angle of the reference beam and/or the data beam may be varied as the holograms are recorded in the recording medium.

In the embodiment of the present invention illustrated in FIG. 6, the medium motion is inside of the polytopic stack distance. Books of angle multiplexed holograms may also be polytopically multiplexed. An initial portion of the book is angle multiplexed using a first set of angles until the maximum number of holograms, under the distortion threshold, are recorded. Then the recording medium may be moved less than the polytopic stack distance and another portion of the book is then recorded with a different set of angles.

Therefore, if Y pages are desired at a given "book" location, but only N holograms may be recorded before the distortion threshold is reached, then the number of "short stacks" of holograms that may recorded is equal to Y divided by N. Each of the short stacks may be separated from adjacent short stacks a small distance, typically within the polytopic stack distance. If the motions between the short stacks are within the polytopic motion, then each hologram still has to have a unique angle. The angles used per stack may be continuous or they may be interleaved between stacks. Although for convenience, the short stacks of the present invention are shown as being circular in shape, the short stacks may be virtually any shape, depending on the shape of the holograms that make up the short stack. For example short stacks and holograms may be regular shapes such: rectangular, square, parallelogram-shaped, trapezoidal, pentagonal, hexagonal, etc. or irregular shaped.

Figure 8:
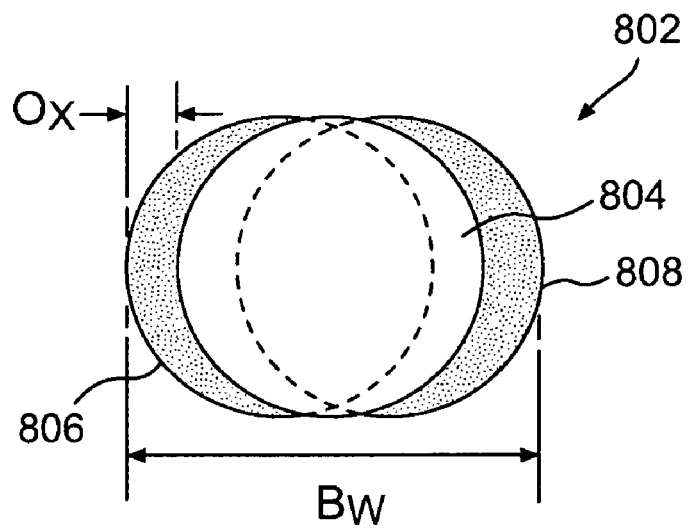
FIG. 8 is a schematic top view of a composite book including three short stacks in accordance with one embodiment of the present invention.
Figure 9:
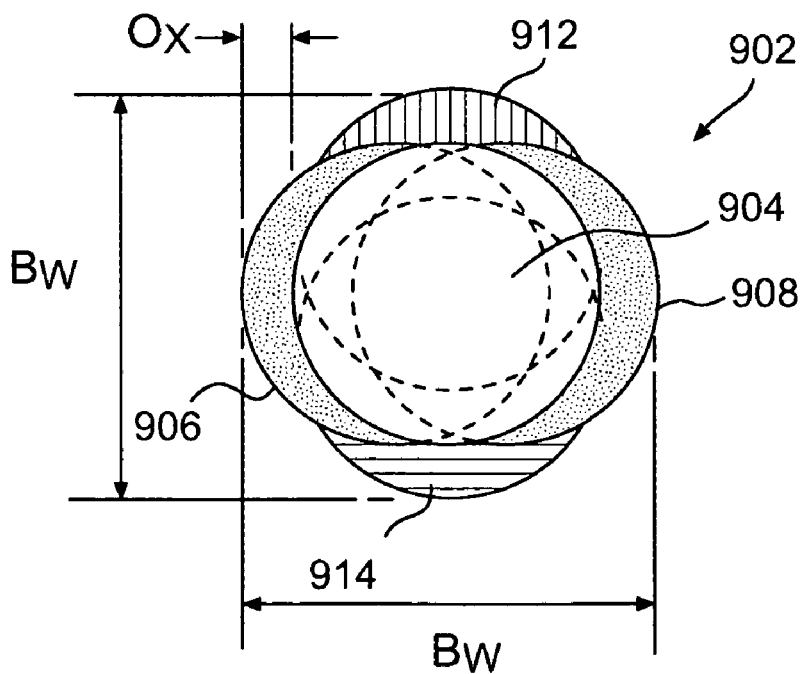
FIG. 9 is a schematic top view of a composite book including five short stacks in accordance with one embodiment of the present invention.
Figure 10:
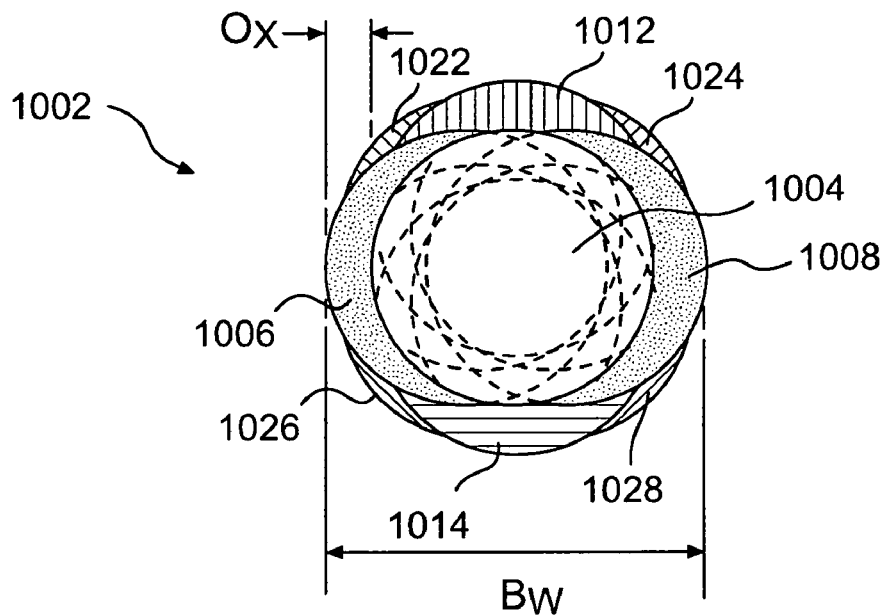
FIG. 10 is a schematic top view of a composite book including nine short stacks in accordance with one embodiment of the present invention.

FIGS. 8, 9 and 10 illustrate some examples of books and short stacks that may be formed using a method such as described above.

FIG. 8 illustrates a composite book 802 according to one embodiment of the present invention including three short stacks: one center short stack 804 and two peripheral short stacks: 806 and 808. Composite book 802 has a maximum book width of $B_w$. The separation distance $o_x$ between short stacks 806 and 808 is greater than 0 but less than the polytopic stack distance for short stacks 806 and 808.

FIG. 9 illustrates a composite book 902 according to one embodiment of the present invention including five short stacks: one center short stack 904 and four peripheral short stacks: 906, 908, 912 and 914. Composite book 902 has a maximum book width of $B_w$. The separation distance $o_x$ between center short stack 904 and short stacks 906, 908, 912 and 914 is greater than 0 but less than the polytopic stack distance for short stacks 904, 906, 908, 912 and 914.

FIG. 10 illustrates a composite book 1002 according to one embodiment of the present invention including nine short stacks: one center short stack 1004 and eight peripheral short stacks 1006, 1008, 1012, 1014, 1022, 1024, 1026 and 1028. Composite book 1002 has a maximum book width of $B_w$. The separation distance $o_x$ between center short stack 1004 and short stacks: 1006, 1008, 1012, 1014, 1022, 1024, 1026 and 1028 is greater than 0 but less than the polytopic stack distance for short stacks: 1004, 1006, 1008, 1012, 1014, 1022, 1024, 1026 and 1028.

In FIGS. 6, 7, 8, 9 and 10 the short stacks may be recorded in any order. Although for simplicity, only several configurations of sub-stacks are shown, virtually any number of sub-stacks may be used in a composite book. For example, in the composite book shown in FIG. 8, any of the short stacks could be eliminated to form a composite book having two short stacks. In the composite books shown in FIG. 9, any of the short stacks could be eliminated to form a composite book having four short stacks. In the composite book shown in FIG. 10, any of the short stacks could be eliminated to form a composite book having eight short stacks. Also, although each of the composite books in FIGS. 6, 7, 8, 9, 10 each show a "center short stack" from which the remaining short stacks are displaced, a composite book of the present invention does not necessarily need to have a center short stack. One example of a composite book without a center short stack is shown in FIG. 7. Also, although the composite books shown in FIGS. 6, 7, 8, 9 and 10 are all at least bilaterally symmetrical, in some embodiments the composite books of the present invention may not be symmetrical due to the arrangement of the component short stacks.

The embodiments of the invention illustrated in FIGS. 6, 7, 8, 9 and 10 may be used in combination with both angle multiplexing and polytopic multiplexing. For example, a portion of a book may be angle multiplexed using a first set of angles. Then the data storage medium may be moved by less than the polytopic amount and another portion of the book may be recorded with a second set of angles. So if Y pages are desired at a given "book" location, but only N holograms can be recorded before distortion starts to hurt the data fidelity, then Y/N=the number short stacks of holograms that may recorded with small relative motions, between them. If these motions are within the polytopic motion, then each hologram still has to have a unique angle. The angles used per stack may be continuous or they may be interleaved between stacks.

Figure 11:
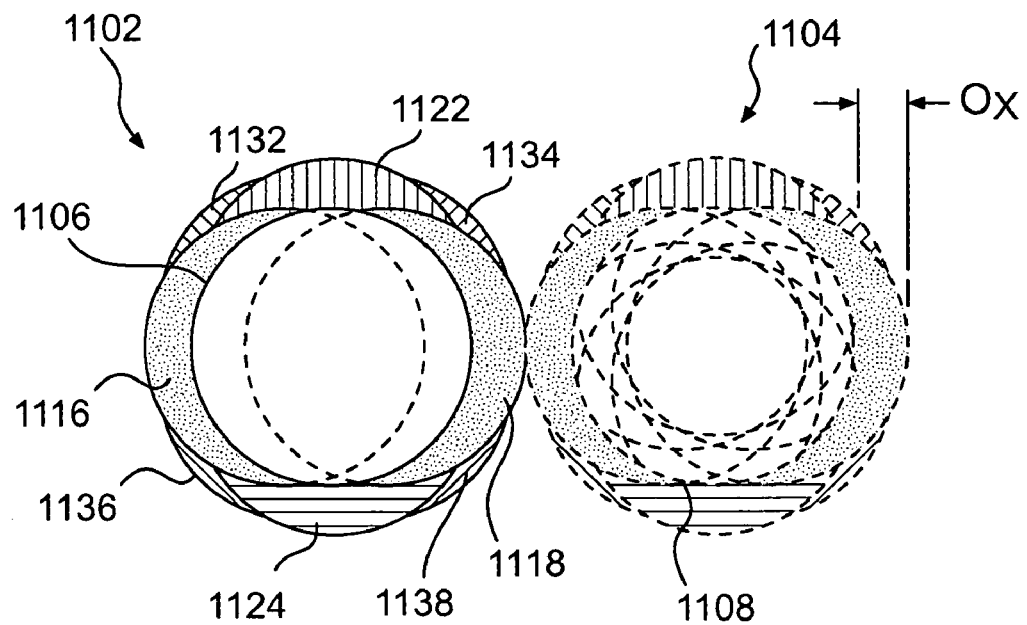
FIG. 11 is a schematic top view of two adjacent non-overlapping books in accordance with one embodiment of the present invention.
Figure 12:
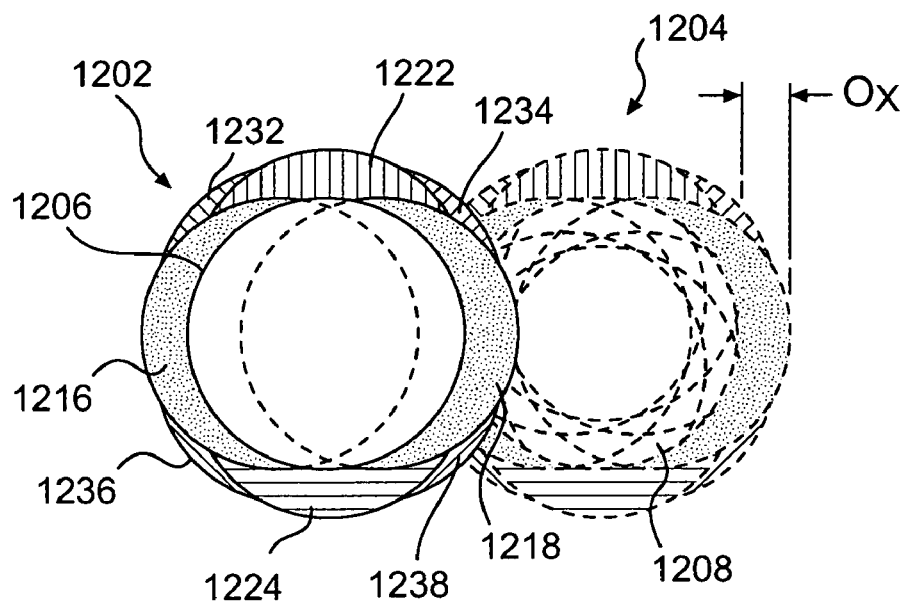
FIG. 12 is a schematic top view of two adjacent overlapping books in accordance with one embodiment of the present invention.

FIGS. 11 and 12 illustrate two sets of books that are similar to the book of FIG. 10. FIG. 11 illustrates a set of two non-overlapping adjacent composite books 1102 and 1104 recorded in a recording medium (not shown) in accordance with one embodiment of the present invention. Composite book 1102 has a center short stack 1106 and composite book 1104 has a center short stack 1108. Composite book 1102 includes eight peripheral short stacks: 1116, 1118, 1122, 1124, 1132, 1134, 1136 and 1138. Composite book 1104 also includes eight peripheral short stacks, but, for clarity of illustration, these short stacks have not been labeled. The separation distance $o_x$ between center short stack 1106 and short stacks: 1116, 1118, 1122, 1124, 1132, 1134, 1136 and 1138 is greater than 0 but less than the polytopic stack distance for short stacks: 1106, 1116, 1118, 1122, 1124, 1132, 1134, 1136 and 1138.

FIG. 12 illustrates a set of two overlapping adjacent composite books 1202 and 1204 recorded in a recording medium (not shown) in accordance with one embodiment of the present invention. Composite book 1202 has a center short stack 1206 and composite book 1204 has a center short stack 1208. Composite book 1202 includes eight peripheral short stacks: 1216, 1218, 1222, 1224, 1232, 1234, 1236 and 1238. The separation distance $o_x$ between center short stack 1206 and short stacks: 1216, 1218, 1222, 1224, 1232, 1234, 1236 and 1238 is greater than 0 but less than the polytopic stack distance for short stacks: 1206, 1216, 1218, 1222, 1224, 1232, 1234, 1236 and 1238. Books 1202 and 1204 overlap by the separation distance $o_x$.

Each short stack shown in FIG. 11 or FIG. 12 may be one hologram or many holograms. In the embodiment of FIG. 11, the books are recorded in a substantially planar first row such that the edge of the first book just touches the edge of the adjacent book. Therefore, the centers of the two adjacent books s are located one book diameter apart. In FIG. 12, the books are recorded such that the distance between the center short stacks of both books is greater than or equal to the polytopic stack distance, $p_x$.

In one embodiment of the present invention, the holograms, short stacks and books of the present invention may be skip-sorted to further reduce cross-talk and to further mitigate physical changes during the recording. Skip-sorting is described in U.S. patent application Ser. No. 09/588,908 entitled "Process for holography involving Skip-sorted hologram storage and in U.S. Pat. No. 6,614,566 the entire contents and disclosure of which are hereby incorporated by reference. Examples of skip-sorting in accordance with the present invention are shown in FIGS. 13, 14, 15, 16, 17, 18, 19 and 20 and are described below.

Figure 13:
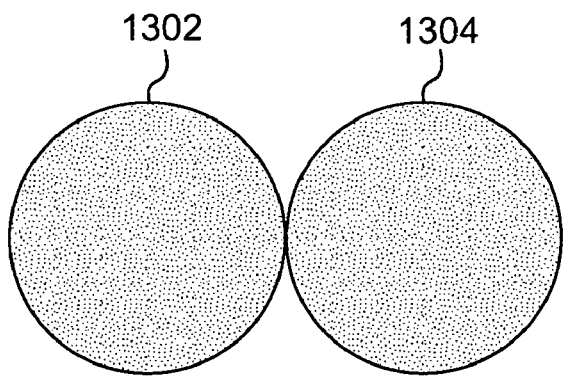
FIG. 13 is a schematic top view of two adjacent non-overlapping books with details omitted for clarity.

FIG. 13 shows a first set of two adjacent non-overlapping books 1302 and 1304 recorded in a recording medium (not shown) in a row and represents the arrangement of the books in FIG. 11.

Figure 15:
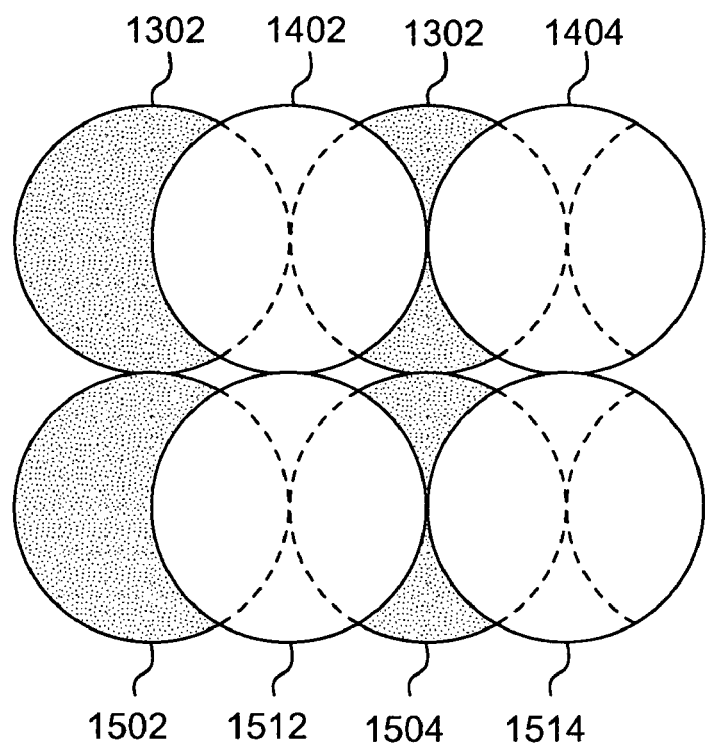
FIG. 15 is a schematic top view of two non-overlapping rows of books, in accordance with one embodiment of the present invention.

FIG. 14 shows how a second set of adjacent non-overlapping books 1402 and 1404, may be recorded, so that the second set of books are shifted from perfect alignment with respect books 1302 and 1304. Together, the first set of books and the second set of books are part of a first row. Subsequent sets of books in the first row, similarly shifted from perfect alignment with the previous set by the same offset distance, are also possible. It is possible for the holograms of an individual set to be spaced closer than one hologram distance. The actual distance depends on tradeoffs made for the particular holographic system, since greater spacing increases uniformity but also slows the speed of the system.

Where more than one row of row of books is desired, according to another embodiment of the present invention, sets of books are stored in a first row as shown in FIG. 14. Then, as shown in FIG. 15, a third set of books, comprising books 1502 and 1504, are formed in a second row adjacent to the first row. The third set of books is arranged such that the center of each book is approximately one book diameter from the center of adjacent books of the third set of books and also approximately one book diameter from the center of an adjacent book of the first set. A fourth set of books, comprising books 1512 and 1514, is then stored in the second row. The fourth set is arranged such that the center of each book is approximately one book diameter from the center of adjacent books of the fourth set of books and also approximately one book diameter from the center of an adjacent book of the second set. Like the second set, the fourth set of books is shifted from perfect alignment with the third set of books by the same offset distance. Again, it is possible to store additional sets in the second row, similarly shifted from perfect alignment with the previous set by the offset distance. In addition to having the third and fourth rows immediately adjacent the first and second rows, it is possible for the third and fourth rows to be located closer, e.g., overlapping a portion of the first and second or to be spaced further apart from the first and second rows.

Once a desired number of adjacent rows, such as the first and second row of FIGS. 13, 14 and 15, are formed, it is possible to form sets of books in rows that overlap such adjacent rows. For example, as shown in FIG. 16, a fifth set of books, represented by center short stacks 1602 and 1604, is stored in a third row that is substantially parallel to the first and second rows and is located such that the third row equally overlaps the first and second rows. The fifth set of books is arranged such that the center of each book is approximately one book diameter from the center of adjacent books of the fifth set of books. The fifth set of books is also located at approximately the mid-way point of a line connecting the centers of adjacent books of the first and third sets, e.g., lines between the centers of center short stacks 1302 and 1402 and between the centers of center short stacks 1304 and 1404. A sixth set of books, comprising books 1612 and 1614, is then stored in the third row. The sixth set of books is arranged such that the center of each book is approximately one book diameter from the center of adjacent books of the sixth set of books. The sixth set of books are shifted from perfect alignment with the fifth set of books by the offset distance, such that, e.g., the center of each book of the sixth set is located directly above the mid-way point of a line connecting the centers of adjacent books of the second and fourth sets. It is possible for the books of the fifth and sixth set to be located other than at these mid-way points, depending on the particular holographic system, e.g., depending on the tradeoff between speed and uniformity. It is also possible for the spacing between adjacent rows to be closer than one hologram diameter. Again, it is possible to form additional sets of books in the third row and also to form similar rows that equally-span or overlap previously-formed rows.

Figure 18:
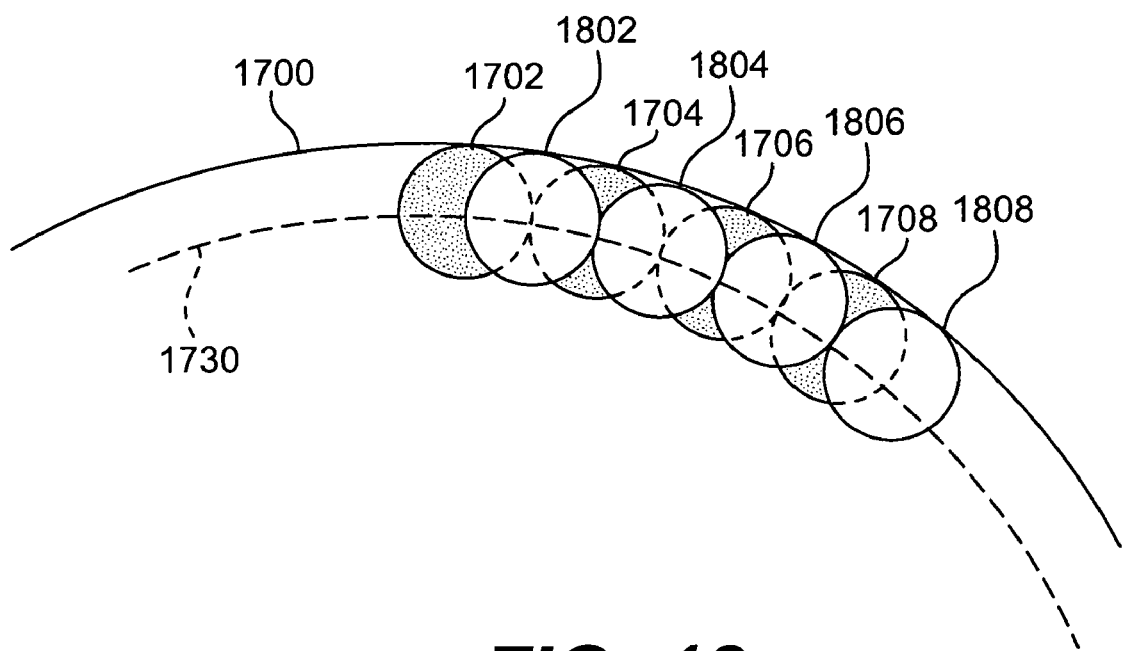
FIG. 18 is a schematic top view of one row of books arranged in an arc in accordance with one embodiment of the present invention.
Figure 19:
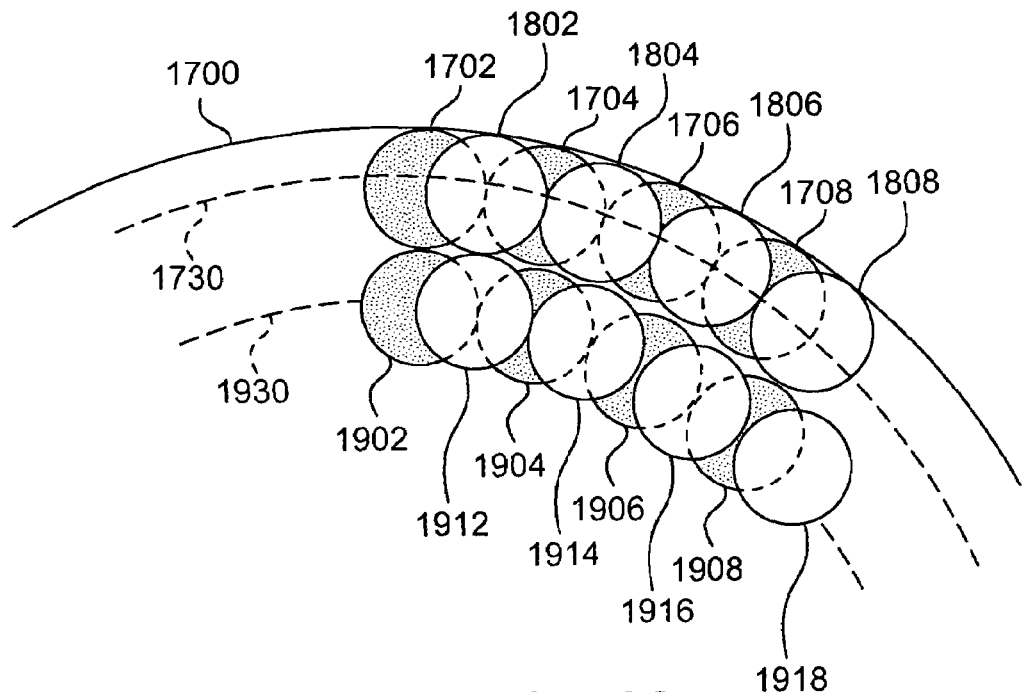
FIG. 19 is a schematic top view of two non-overlapping rows of books arranged in an arc in accordance with one embodiment of the present invention.
Figure 20:
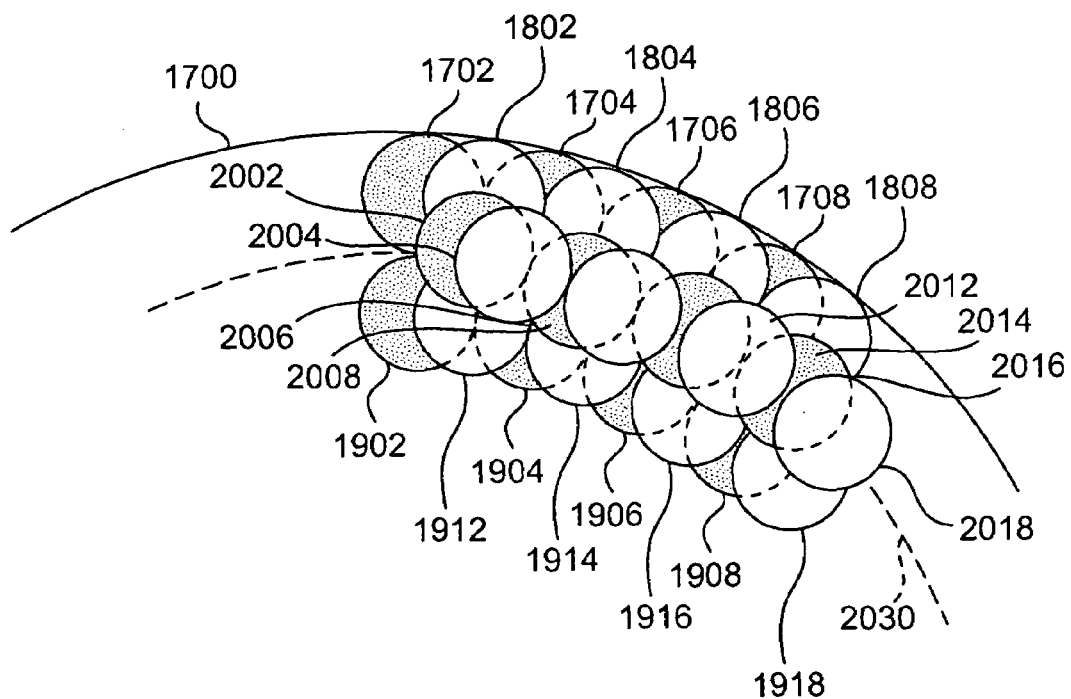
FIG. 20 is a schematic top view of three overlapping rows of books arranged in an arc in accordance with one embodiment of the present invention.

Although a few configurations of rows are shown in FIGS. 13, 14, 15 and 16, many other configurations of sets and rows are also possible with overlapping or non-overlapping sets and rows in various combinations, both uniform and non-uniform. Also, although, for simplicity, FIGS. 13, 14, 15 and 16 show arrangements for sets of non-overlapping adjacent books, such as shown in FIG. 11, similar arrangements may be used with sets of overlapping adjacent books, such as shown in FIG. 12. Also, although the offset distance between overlapping books and rows shown in FIGS. 18, 19 and 20 is shown as being relatively large, the offset distance may be as small as the polytopic distance between the overlapping books and/or rows.

Also, although the books in FIGS. 11, 12, 13, 14, 15 and 16 each include 9 short stacks, the books of the present invention that are recorded in rows may include various numbers of short stacks. Also, although for convenience, books having center short stacks are shown in FIGS. 11, 12, 13, 14, 15 and 16, books without center short stacks may also be recorded in rows.

As noted above, the storage techniques of the invention are useful with a variety of spatial multiplexing techniques, such as shift multiplexing, aperture multiplexing, or phase correlation multiplexing.

In FIGS. 17, 18, 19 and 20 the books are each similar to the books shown in FIG. 11. Although, for simplicity, FIGS. 17, 18, 19 and 20 show arrangements for sets of non-overlapping adjacent books, such as shown in FIG. 11, similar arrangements may be used with sets of overlapping adjacent books, such as shown in FIG. 12. Also, for simplicity, in FIGS. 17, 18, 19 and 20, it is assumed that all of the short stacks have the same width/diameter and that this width/diameter is the same as the width of all of the holograms in each of the short stacks and books. In addition, although for simplicity arcs of books are shown in FIGS. 17, 18, 19 and 20, arrangements similar to those shown in FIGS. 17, 18, 19 and 20 may be used with books arranged in concentric circles/rings.

Figure 17:
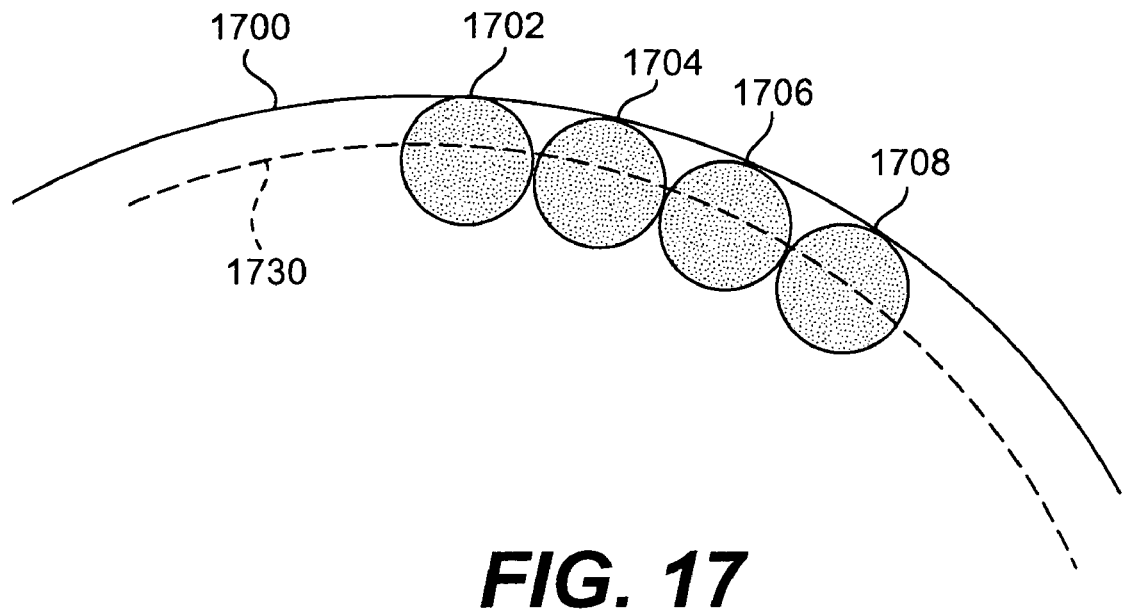
FIG. 17 is a schematic top view of four non-overlapping adjacent books arranged in an arc in accordance with one embodiment of the present invention.

In another aspect of the invention, reflected in FIGS. 17 and 18, holograms are stored in or on a disk-shaped medium 1700, e.g., a rotating disk. A first set of books, comprising books 1702, 1704, 1706 and 1708, are stored in a substantially planar curved first row, with the center of each book arranged a along an arc 1730, such that each book just touches the next. Then, as shown in FIG. 18, a second set of books, comprising 1802, 1804, 1806 and 1808 are also stored in the first row with the center of each book in the second set being arranged along arc 1730. The second set of books is shifted from perfect alignment with the first set of books by an offset distance. It is possible to form additional sets of books in the first row, each set shifted from the perfect alignment with the previous set by the offset distance.

FIGS. 19 and 20 show storage of several rows of holograms on a disk-shaped medium 1700. The first set of books 1702, 1704, 1712 and 1714 and the second set of books 1802, 1804, 1806 and 1808 are stored as discussed in the previous paragraph. Then, as shown in FIG. 19 a third set of books 1902, 1904, 1906 and 1908 are formed in a substantially planar second row adjacent to the first row. The fourth set of books 1912, 1914, 1916 and 1918 is then stored in the second row, but shifted from perfect alignment with the third set of books by an offset distance. The centers of the books in the second row of books are arranged along an arc 1930 that is displaced one book diameter inward from arc 1730.

Once the desired number of adjacent rows are formed, e.g., as in FIG. 19, it is possible to form overlapping rows. For example, fifth and sixth sets of books may be stored as shown in FIG. 20. The fifth set of books 2002, 2004, 2006 and 2008 is stored in a third row that is substantially planar with the first and second rows and equally overlaps the first and second rows (equally meaning that the amount of the third row books extending into the first row is approximately the same as the amount extending into the second row). A sixth set of books 2012, 2014, 2016 and 2018 is then stored in the third row. The sixth set of books are shifted from perfect alignment with the fifth set of holograms by an offset distance. The centers of the books in the third row of books are arranged along an arc 2030 that is displaced 0.5 of a book diameter inward from arc 1730 (not shown in FIG. 20) and 0.5 of a book diameter outward from arc 1930 (not shown in FIG. 20).

Although a few configurations of rows are shown in FIGS. 17, 18, 19 and 20, many other configurations of sets and rows are also possible with overlapping or non-overlapping sets and rows in various combinations, both uniform and non-uniform. Also, although, for simplicity, FIGS. 17, 18, 19 and 20 show arrangements for sets of non-overlapping adjacent books, such as shown in FIG. 11, similar arrangements may be used with sets of overlapping adjacent books, such as shown in FIG. 12. Also, although the offset distance between overlapping books and rings of books shown in FIGS. 18, 19 and 20 is shown as being relatively large, the offset distance may be as small as the polytopic distance between the overlapping books and/or rings of books.

In the embodiments shown in FIGS. 18, 19 and 20, the offset distance between overlapping books in each row may be the same for all rows or may be different for each row. Also, although the offset distance between overlapping books and rows shown in FIGS. 18, 19 and 20 is shown as being relatively large, the offset distance may be as small as the polytopic stack distance between the overlapping books and/or rows.

The remainder of a disk-shaped medium is typically filled in the same manner discussed above, i.e., by sectors, where the sectors are typically rings. Again, the number of rows capable of being formed in each sector is a matter of design choice. Also, for longer rings or arcs having larger angles, the number of books in each ring or arc may vary with respect to other arcs or rings. For example, there is space for more books in an outer ring of a disk-shaped medium than in an inner ring, due to the size of a rings decreasing as the radius of the ring decreases. Similarly, for arcs of a given angle, there is space for more books in an outer arc than in an inner arc, due to the length of the arcs decreasing as the radius of the arcs decrease.

Although in FIGS. 13-20, the books, sets and rows are described and shown as being in a particular order, the various configurations of books, sets and rows shown in FIGS. 13-20 may be recorded in any order. For example, in FIG. 16, second, fourth and sixth sets of books could be recorded and then the first, third and fourth sets of books could be recorded, or all of the books in a column of books, such as the column of books comprising books 1302, 1602 and 1502 could be recorded before recording another column of books, etc. Furthermore, short stacks of each book, set, row of books, or all of the rows of books, for the configurations shown in FIGS. 13-20 may be recorded in any order. For example, in FIG. 16, in each row, a short stack of each of the four books may be recorded, before a second short stack of each book is recorded, or a short stack in each of the twelve books shown may be recorded, before recording a second short stack of any of the books, etc.

Although in FIGS. 17, 18, 19 and 20 the books are each similar to the books shown in FIG. 11, if books in the outer row are spaced from the edge, then books resembling the books of FIG. 12 may be used in embodiments similar to the embodiments shown in FIGS. 17, 18, 19 and 20. Also, although the books in FIGS. 17, 18, 19 and 20 each include four short stacks, the books recorded in an arc may include various numbers of short stacks. Also, although for convenience, books having center short stacks are shown in FIGS. 17, 18, 19 and 20, books without center short stacks may also be recorded in arcs.

Although the books described and shown in FIGS. 11-20 are symmetric, the books of the present invention may have various shapes including asymmetric shapes, depending on the location and number of short stacks in a book and the shapes of the holograms in the short stacks.

To fill a recording medium with books, the books are typically stored in distinct sections of the medium, e.g., the medium is virtually separated into sectors. A variety of rows are capable of being formed, depending on, for example, the particular system, multiplexing technique and medium. In some embodiments of the present invention, there may be overlap between books of the distinct sections. In addition, for square or rectangular media, blank or dummy books may be stored along the edges (at opposite ends of the substantially linear rows), i.e., books with no data, because the background shrinkage and exposure are often not uniform enough at these edges to provide sufficient signal to noise ratio.

As noted above, by performing this storage technique, the background for each subsequent set stored in a given row becomes relatively stable, compared to more conventional storage techniques. Specifically, the typically unavoidable polymeric shrinkage has taken place relatively uniformly across the row due to the non-overlap (or controlled overlap) of the previously-stored set of books.

The storage techniques of the present invention may be useful for addressing the shrinkage typically encountered with photopolymer-type media, as noted above. A variety of such photopolymer media are known to those skilled in the art. See, e.g., co-assigned U.S. Pat. Nos. 5,874,187, 6,322, 932 and 6,103,454, the entire contents and disclosures of which are hereby incorporated by reference.

In the embodiments of the present invention shown in FIGS. 11-20, the short stacks of the books may be written in any order. For example, in FIG. 11, all nine short stacks of one book may be written before writing the nine short stacks of the second book. In another embodiment, one short stack in each book may be recorded in each book, before recording the second short stack in each book. For example, center short stack 1106 of the first book could be recorded, followed by center short stack 1108 of the second book. Then, short stack 1118 of the first book could be recorded, followed by the short stack corresponding to short stack 1118 in the second book and so forth. The two short stacks that are recorded may have the same or different positions in each book. For example, short stack 1116 of the first book could be recorded, followed by recording the short stack of the second book corresponding to short stack 1122 of the first book. Then, short stack 1118 of the first book could be recorded, followed by recording the short stack of the second book corresponding to short stack 1124 of the first book and so forth. Although FIG. 11 only shows two books, similar methods of recording short stacks may be used for a row or arc of books or several rows and arcs of books in a recording medium. The choice of which method can be chosen based on many factors such as index uniformity, medium dynamic range uniformity, writing speeds, or any other medium or system considerations.

The books recorded as disclosed above can then be skip-sorted as per U.S. Pat. No. 6,614,566, or the stacks themselves may also be skip-sorted. For example, each book may consist of three short stacks: N1, N2 and N3, each corresponding to a part of the angular range within the total angular range of the book. Skip-sorting may be done by writing all three short stacks as a single skip-sorting location and then moving to the next skip-sorting location, or each of the three short stacks can be written as a separate skip-sorting location. The choice of which method can be chosen based on many factors such as index uniformity, media dynamic range uniformity, writing speeds, or any other media or system considerations. The process is repeated until all addresses, (or dynamic range), at all the adjacent locations are exhausted.

One advantage of recording using this strategy is the evolution of the media optical properties is gradual allowing for efficient use of the recording volumes and minimization of any recording induced non-uniformity.

Although for convenience, in the embodiments described above and shown in the drawing figures, the books all have the same diameter/width, in some embodiments of the present invention, different books in a recording medium may have different diameters to allow for more even distribution in a recording medium. Also, although for convenience, the books described above and shown in the drawings figures have a circular cross-section, the books of the present invention may have different shapes and different shaped books may be recorded in a single recording medium. In addition, although for convenience, the short stacks described above and shown in the drawings figures have a circular cross-section, the short stacks of the present invention may have different shapes.

Although in the embodiments of the present invention described above and shown in the drawing figures, the recording medium, books and short stacks are shown as having flat upper and lower surfaces, the recording media, books and short stacks of the present invention may have various three-dimensional shapes.

Figure 21:
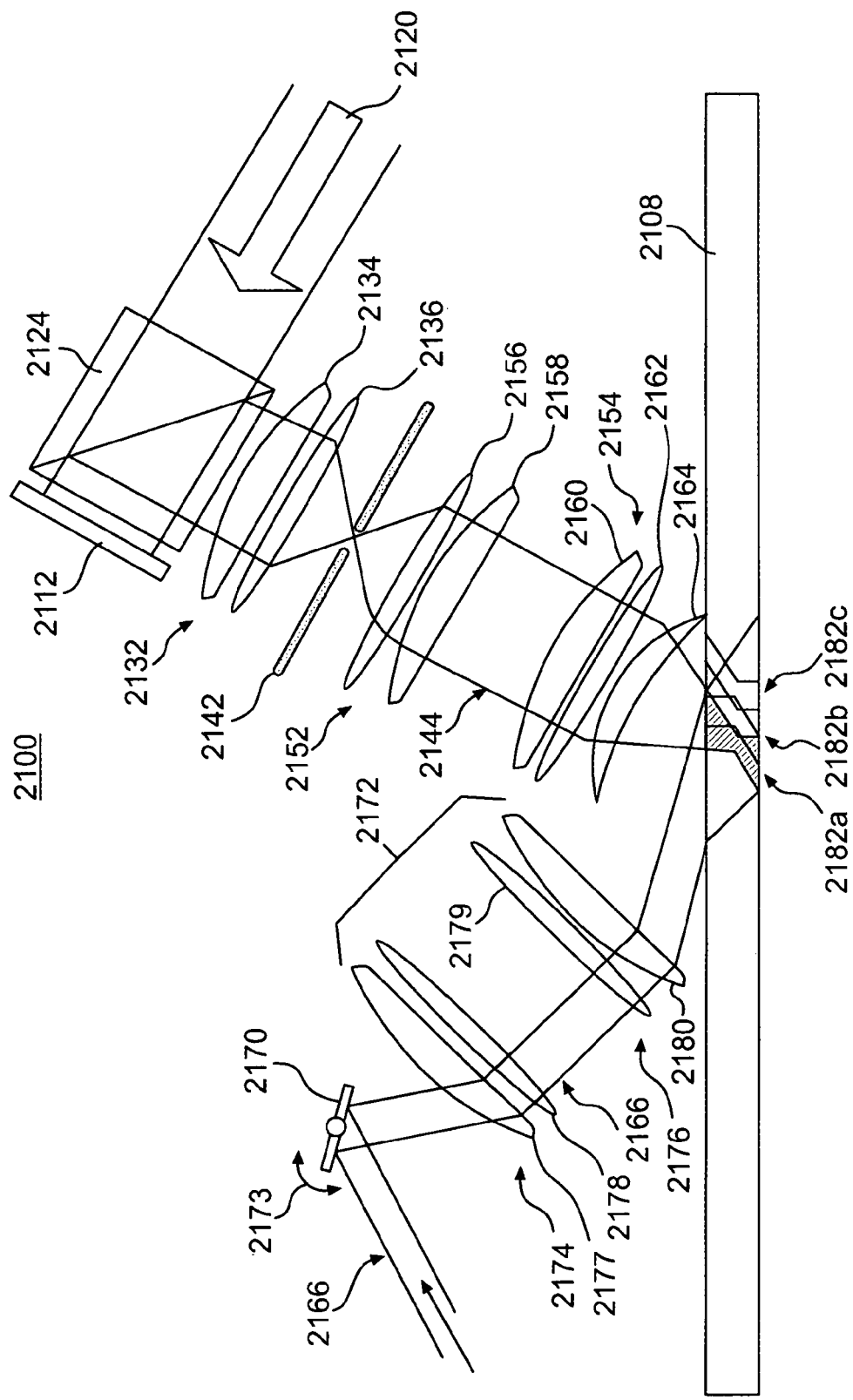
FIG. 21 is a diagram illustrating a holographic system for recording holograms in accordance with one embodiment of the present invention.

FIG. 21 is a diagram illustrating a holographic system 2100 for carrying out the method in accordance with the present invention. This holographic system is an illustration of a particular type of multiplexing called polytopic-angular multiplexing that can be used to perform the method of short-stacking. This architecture is illustrated as one possible implementation of short stacking. This description is not a comprehensive description of polytopic angle multiplexing. For a more in depth description of this architecture, please refer to U.S. Published Patent Application No. 2004-0179251, entitled "Polytopic multiplex holography", filed Sep. 16, 2004, the entire contents and disclosure of which is incorporated herein by reference.

Holographic system 2100 is for generating and reading out holograms in holographic medium 2108. Holographic system 2100 includes a reflective spatial light modulator (SLM) 2112 for providing data for holograms to be recorded in medium 2108. SLMs are well understood by those skilled in the art. An incident signal beam 2120 is directed through a polarizing beam splitter 2124 and onto SLM 2112. The resulting modulated beam has "on" pixels that are a polarization that is rotated 90 degrees with respect to the input light and therefore reflects off the polarizing beam splitter 2124 and passes through a first Fourier transform (FT) lens 2132, which, in the embodiment shown in FIG. 21, consists of two elements: 2134 and 2136. Lens 2132 produces a Fourier transform at a polytopic filter 2142. The polytopic filter 2142 filters the signal and produces a truncated Fourier transform of the modulated signal beam 2144 that is then imaged close to or into the media with lenses 2152 and 2154, which are illustrated as two element and three element lenses, respectively. Lens 2152 includes elements 2156 and 2158. Lens 2154 includes elements 2160, 2162 and 2164. Medium 2108 may be any media capable of storing holograms, but preferred media include media available under the Tapestry™ brand name from InPhase Technologies of Longmont, Colo. Such media includes a photopolymer disclosed in U.S. Pat. No. 6,482,551 to Dahr et al. for "Optical Article and Process for Forming Article," which is incorporated by reference in its entirety. Also, medium 2108 may be in the form of a card having rectangular or other shape or in the form of a tape.

Lens 2154 directs an incident signal beam 2144 through medium 2108 such that the signal beam 2144 and reference beam 2166 overlap to create a interference pattern that can be recorded as a hologram by medium 2108. A plurality of reference beams 2166 can be used to record a plurality of holograms. As discussed above, a plurality of holograms may be multiplexed in known manners at a single location in medium 2108. In FIG. 21, this multiplexing is accomplished by changing the incidence angle of the reference beam using a rotating mirror 2170 and imaging mirror 2170 into medium 2108 with a two lens imaging system 2172, while retaining the overlap between signal beam 2144 and reference beam(s) 2166. Rotating mirror 2170 that may rotate as shown by double-headed arrow 2173. Imaging system 2172 includes lenses 2174 and 2176. Lens 2174 includes two elements: elements 2177 and 2178. Lens 2176 includes two elements: elements 2179 and 2180. After generating at least a first hologram at a first reference beam angle and at a first location, 2182a, in medium 2108, represented in FIG. 21 by a hour glass shaped grating pattern, medium 2108 and the combination of SLM 2112, beam splitter 2124 and lenses 2132 and 2152, 2154 and polytopic filter 2142 can be shifted with respect to each other in a known manner to generate additional holograms, represented in FIG. 21 by hour glass grating patterns 2182b and 2182c, which are not at the first location 2182a in medium 2108. As shown in FIG. 21, holograms at locations 2182a, 2182b and 2182c preferably overlap with each other at locations other than their beam waist. As such, groups or stacks of multiplexed holograms are recorded in a line in medium 2108. As also discussed above, the waists of the incident beams generating the holograms at locations 2182a, 2182b and 2182c, however, do not spatially overlap. However, when performing the method of short stacking, the waist of the recorded grating 2182a is only non-overlapping with the waist of the recorded gratings 2182b and 2182c for the same reference beam angle. However, the waist of the recorded grating 2182a recorded with a first reference beam may overlap with the waist of the recorded grating 2182b recorded with a second reference beam that differs from the first by, for example, a change in the angle of incidence of the reference beam. In this way, a book may be distributed spatially via short stacking to optimize the media distortion. Since the waists of a particular holographically recorded book are now spatially separated from one another, it is crucial that they can still be separated from its neighboring books. In other words, the necessary requirement is that any recorded hologram has a unique combination of beam waist location and reference beam angle. Holograms recorded with the same reference beam angle cannot overlap at their beam waists and holograms beam waists can only overlap as long as they don't have the same reference beam recording angle.

It is to be understood that holograms 2182b and 2182c generated by the interference of the focusing signal beam 2144 and reference beam 2166 may be generated using the same reference beam used to generate a hologram at 2182a. As used herein, "same reference beam" indicates a reference beam having substantially the same characteristics such as angle of incidence, phase and wavelength, for example, as a comparison reference beam, but may otherwise be shifted in space or time. As such, the same reference beam can generate a hologram with two different signal beams at different times and at different locations. Thus, if there are a plurality of holograms angle multiplexed at grating location 2182a, holograms generated at grating location 2182b and 2182c may be generated using reference beams having substantially the same multiplexing angles, phases, wavelengths, wavefronts, etc., as those generated at grating location 2182a, even though the holograms at grating locations 2182b and 2182c may partially overlap with holograms at grating location 2182a of the same multiplexing angle, phase, wavelength, wavefront, etc., as long as the beam waists of grating location 2182b and 2182c do not overlap with the waist of grating location 2182a.

Figure 22:
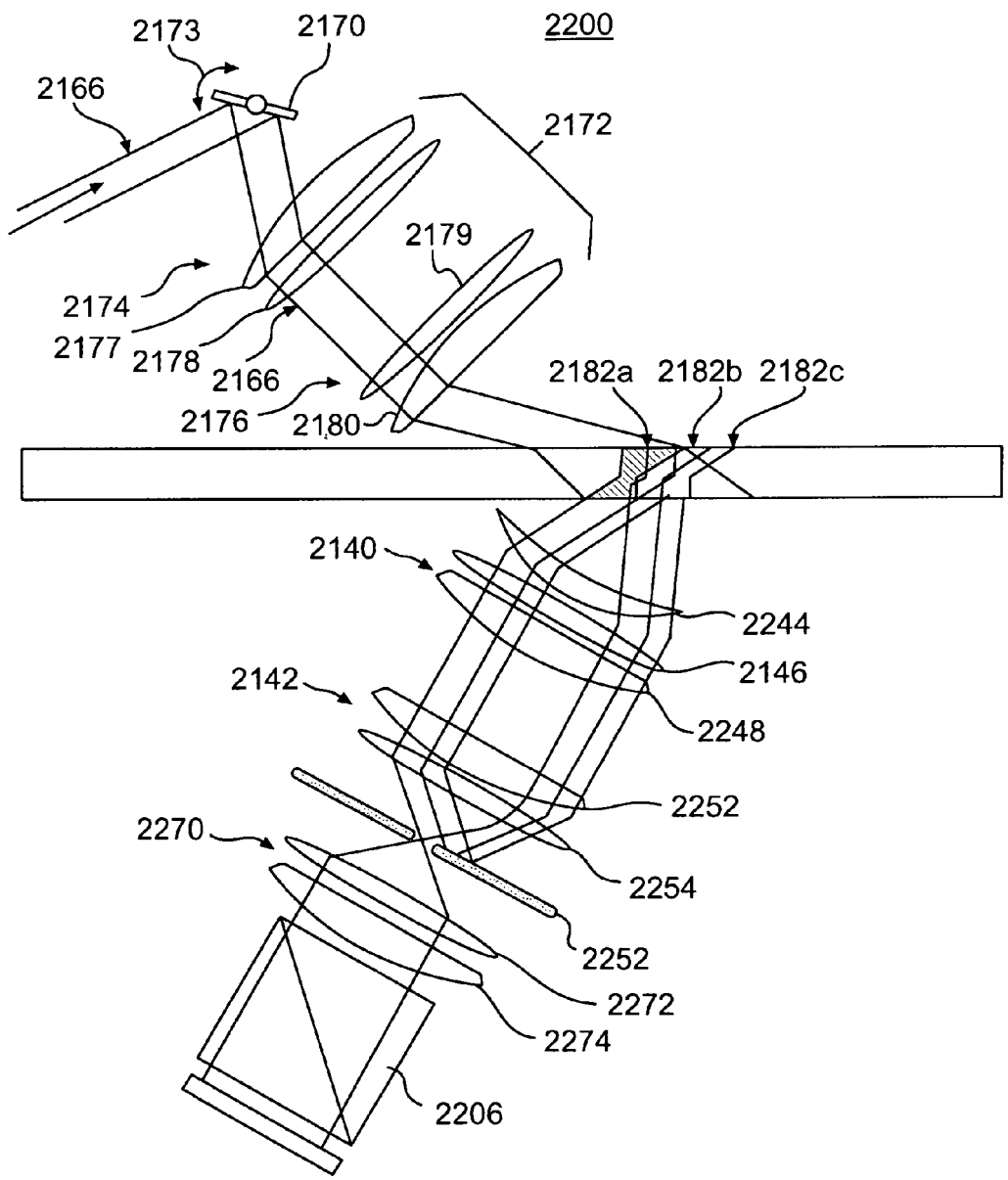
FIG. 22 illustrates a system for reading out a polytopically multiplexed hologram from a medium in accordance with one embodiment of the present invention.

FIG. 22 illustrates a system 2200 for reading out a polytopically multiplexed hologram from medium 2108 at grating location 2182a. A readout beam that is the same as reference beam 2166 and is spatially coincident with reference beam 2166 may be used to regenerate the hologram at grating location 2182a. However, as discussed above, because holograms have also been created at grating locations 2182b and 2182c using the same reference beam that created the hologram at grating location 2182a and which can partially overlap with the hologram at grating location cone 2182a, the holograms at grating locations 2182b and 2182c may also be regenerated with a readout beam that is the same as reference beam 2166 and spatially coincident therewith.

In order to avoid the holograms at grating locations 2182b and 2182c from be detected by detector 2206 when the hologram at grating location 2182a is desired, a filter block 2210 is used to filter out the signals generated from holograms at grating locations 2182b and 2182c. As noted above, the regenerated signal beams from the holograms at grating locations 2182a, 2182b and 2182c do not overlap at the beam waists. Because of this, the filter block 2210 is placed at an image plane of the beam waist and therefore blocks reconstructed signals at the imaged beam waist from any other neighboring grating locations such as 2182b and 2182c. The signal carrying a readout of the hologram at grating location 2182a is imaged onto the filter block 2210 by lens 2240 and lens 2242. Lens 2240 includes three elements: 2244, 2246 and 2248. Lens 2240 includes two elements: 2252 and 2254. Lens 2270 Fourier transforms the filtered signal beam onto the detector 2206. Lens 2270 includes two elements 2272 and 2274.

All documents, patents, journal articles and other materials cited in the present application are hereby incorporated by reference.

Although the present invention has been fully described in conjunction with several embodiments thereof with reference to the accompanying drawings, it is to be understood that various changes and modifications may be apparent to those skilled in the art. Such changes and modifications are to be understood as included within the scope of the present invention as defined by the appended claims, unless they depart therefrom.

What is claimed is:

1. A product comprising:
    a recording medium; and
    one or more books of holograms recorded in the recording medium, wherein two or more short stacks of the one or more books have spatial locations that differ from each other by a distance which is greater than 0 but less than the polytopic stack distance for the two or more short stacks.

2. The product of claim 1, wherein the two or more short stacks have spatial locations that differ from each other by a rotational movement about the center of one of the one or more books that is greater than 0 but less than the 360 degrees.

3. The product of claim 1, wherein the two or more short stacks have spatial locations that differ from each other by a rotational movement about an axis that differs from the center of the one or more books and is greater than 0 but less than the 360 degrees.

4. The product of claim 1, wherein the one or more books comprises a plurality of books 5. The product of claim 4, wherein the plurality books comprise rows of books.

6. The product of claim 5, wherein adjacent books in each row overlap each other.

7. The product of claim 5, wherein at least some of the rows overlap each other.

8. The product of claim 4, wherein the one or more books are arranged in concentric circles of books.

9. The product of claim 8, wherein adjacent books in each concentric circle of books overlap each other.

10. The product of claim 8, wherein at least some of the concentric circles overlap each other.

11. The product of claim 4, wherein the holograms are skip-sorted by short stacks, by books, by rows of books, by columns of books or combinations thereof.

12. The product of claim 4, wherein the holograms are skip-sorted by short stacks.

13. The product of claim 4, wherein the holograms are skip-sorted by books.

14. The product of claim 4, wherein the holograms are skip-sorted by rows of books.

15. The product of claim 4, wherein the holograms are skip-sorted by columns of books.

16. The product of claim 4, wherein the holograms are skip-sorted by rows and columns of books.

17. The product of claim 4, wherein the plurality of books are polytopically multiplexed.

18. A method comprising:
    recording a first short stack of holograms for each of one or more books in a recording medium; and
    recording one or more second short stacks of holograms for each of one or more books within the recording medium, wherein the first short stack and each second short stack of each of the one or more books spatial locations that differ from each other by a distance which is greater than 0 but less than the polytopic stack distance for the first and second short stacks.

19. The method of claim 18, wherein the spatial locations differ from each other due to a movement of the recording medium or a movement of a recording device used to record the first and second short stacks of holograms.

20. The method of claim 19, wherein the spatial locations of the first short stack and each second short stack differ from each other by a movement difference that is defined as a rotational movement about the center of the one or more books that is greater than 0 but less than the 360 degrees.

21. The method of claim 19, wherein the spatial locations of the first short stack and each second short stack differ from each other by a movement difference that is defined as a rotational movement about an axis that differs from the center of the one or more books and is greater than 0 but less than the 360 degrees.

22. The method of claim 18, wherein the one or more books comprises a plurality of books.

23. The method of claim 22, wherein the one or more books comprise rows of books.

24. The method of claim 23, wherein adjacent books in each row overlap each other.

25. The method of claim 23, wherein at least some of the rows overlap each other.

26. The method of claim 22, wherein the one or more books are arranged in concentric circles of books.

27. The method of claim 26, wherein adjacent books in each concentric circle of books overlap each other.

28. The method of claim 26, wherein at least some of the concentric circles overlap each other.

29. The method of claim 22, wherein the holograms of the first short stack, second short stack, or combination thereof are recorded by skip-sorting by short stacks, by books, by rows of books, by columns of books or combinations thereof.

30. The method of claim 22, wherein the holograms of the first short stack, second short stack, or combination thereof are recorded by skip-sorting by short stacks.

31. The method of claim 22, wherein the holograms of the first short stack, second short stack, or combination thereof are recorded by skip-sorting by books.

32. The method of claim 22, wherein the holograms of the first short stack, second short stack, or combination thereof are recorded by skip-sorting by rows of books.

33. The method of claim 22, wherein the holograms of the first short stack, second short stack, or combination thereof are recorded by skip-sorting by columns of books.

34. The method of claim 22, wherein the holograms of the first short stack, second short stack, or combination thereof are recorded by skip-sorting by rows and columns of books.

35. The method of claim 22, wherein the one or more books comprise a plurality of books and wherein the plurality of books are recorded using polytopically multiplexing.

36. A device comprising:
    recording means for recording holograms to a recording medium; and
    control means for enabling the recording means to record one or more books of holograms in the recording medium, wherein two or more short stacks of the one or more books have spatial locations that differ from each other by a distance which is greater than 0 but less than the polytopic stack distance for the two or more short stacks.

37. The device of claim 36, wherein the control means includes software for controlling the operation of the recording means in recording the one or more books of holograms.

38. The device of claim 36, wherein the one or more holograms comprise a plurality of holograms.

39. The device of claim 36, further comprising a reading means for reading the holograms recorded in the recording medium.

40. A method comprising:
providing one or more books of holograms recorded in the recording medium, wherein two or more short stacks of each of the one or more books have spatial locations that differ from each other by a distance which is greater than 0 but less than the polytopic stack distance for the two or more short stacks; and
reading the holograms from the one or more books to provide information from the holograms to a user.

41. A device comprising:
reading means for reading holograms recorded in a recording medium; and
control means for enabling the reading means to read holograms from one or more books of holograms recorded in the recording medium, wherein two or more short stacks of each of the one or more books have spatial locations that differ from each other by a distance which is greater than 0 but less than the polytopic stack distance for the two or more short stacks.

42. The device of claim 41, wherein the control means includes software for controlling the operation of the reading means in reading the holograms from the one or more books of holograms.

43. The device of claim 42, wherein the one or more holograms comprise a plurality of holograms.

44. A product comprising:
a recording medium; and
one or more books of holograms recorded in the recording medium, wherein two or more short stacks of each of the one or more books have locations that differ from each other by a movement difference;
wherein the one or more books comprises a plurality of books;
wherein the plurality books comprise rows of books;
wherein at least some adjacent short stacks in each row overlap each other by an amount greater than 0 but less than the polytopic stack distance for all of the short stacks in the adjacent books that overlap.

45. A product comprising:
a recording medium; and
one or more books of holograms recorded in the recording medium, wherein two or more short stacks of each of the one or more books have locations that differ from each other by a movement difference;
wherein the one or more books comprises a plurality of books;
wherein the one or more books are arranged in concentric circles of books;
wherein at least some adjacent short stacks in each row overlap each other by an amount greater than 0 but less than the polytopic stack distance for all of the short stacks in the adjacent books that overlap.

46. A method comprising:
recording a first short stack of holograms for each of one or more books in a recording medium; and
recording one or more second short stacks of holograms for each of one or more books within the recording medium, wherein the first short stack and each second short stack of each of the one or more books have locations that differ from each other by a movement difference;
wherein the one or more books comprises a plurality of books;
wherein the one or more books comprise rows of books;
wherein at least some adjacent books in each circle overlap each other by an amount greater than 0 but less than the polytopic stack distance for all of the short stacks in the adjacent books that overlap.

47. A method comprising:
recording a first short stack of holograms for each of one or more books in a recording medium; and
recording one or more second short stacks of holograms for each of one or more books within the recording medium, wherein the first short stack and each second short stack of each of the one or more books have locations that differ from each other by a movement difference;
wherein the one or more books comprises a plurality of books;
wherein adjacent books in each concentric circle of books overlap each other;
wherein at least some adjacent books in each circle overlap each other by an amount greater than 0 but less than the polytopic stack distance for all of the short stacks in the adjacent books that overlap.

48. A product comprising:
a recording medium; and
one or more books of holograms recorded in the recording medium, wherein two or more short stacks of each of the one or more books have locations that differ from each other by a movement difference
wherein the locations differ by an optimized short stack spacing.

49. A method comprising:
recording a first short stack of holograms for each of one or more books in a recording medium; and
recording one or more second short stacks of holograms for each of one or more books within the recording medium, wherein the first short stack and each second short stack of each of the one or more books have locations that differ from each other by a movement difference;
wherein the locations differ by an optimized short stack spacing.

50. A device comprising:
recording means for recording holograms to a recording medium; and
control means for enabling the recording means to record one or more books of holograms in the recording medium, wherein two or more short stacks of each of the one or more books have locations that differ from each other by a movement difference;
wherein the locations differ by an optimized short stack spacing.

51. A method comprising:
providing one or more books of holograms recorded in the recording medium, wherein two or more short stacks of each of the one or more books have locations that differ from each other by a movement difference; and
reading the holograms from the one or more books to provide information from the holograms to a user;
wherein the locations differ by an optimized short stack spacing.

52. A device comprising:
reading means for reading holograms recorded in a recording medium; and
control means for enabling the reading means to read holograms from one or more books of holograms recorded in the recording medium, wherein two or more short stacks of each of the one or more books have locations that differ from each other by a movement difference;
wherein the locations differ by an optimized short stack spacing.

* * * * *